US008269861B2

(12) United States Patent  
Aragaki

(10) Patent No.: US 8,269,861 B2
(45) Date of Patent: Sep. 18, 2012

(54) IMAGE ACQUISITION APPARATUS WHICH HAS A FOCUS DETECTION FUNCTION AND PROGRAM RECORDING DEVICE

(75) Inventor: Hideya Aragaki, Hino (JP)

(73) Assignee: Olympus Corporation, Tokyo (JP)

( * ) Notice: Subject to any disclaimer, the term of this patent is extended or adjusted under 35 U.S.C. 154(b) by 224 days.

(21) Appl. No.: 12/644,353

(22) Filed: Dec. 22, 2009

(65) Prior Publication Data

US 2010/0097503 A1   Apr. 22, 2010

Related U.S. Application Data

(63) Continuation of application No. PCT/JP2008/061662, filed on Jun. 26, 2008.

(30) Foreign Application Priority Data

Jun. 28, 2007 (JP) ................................. 2007-170833

(51) Int. Cl.
- H04N 5/217 (2006.01)
- H04N 5/225 (2006.01)
- H04N 5/232 (2006.01)

(52) U.S. Cl. .................... 348/241; 348/340; 348/345
(58) Field of Classification Search .................. None
See application file for complete search history.

(56) References Cited

U.S. PATENT DOCUMENTS

| 4,185,191 A | 1/1980 | Stauffer | |
| 6,766,112 B2 * | 7/2004 | Kuwata et al. | 396/114 |
| 6,781,632 B1 * | 8/2004 | Ide | 348/345 |
| 6,819,360 B1 | 11/2004 | Ide et al. | |
| 6,829,008 B1 | 12/2004 | Kondo et al. | |
| 7,737,386 B2 * | 6/2010 | Goto | 250/201.2 |
| 7,791,667 B2 * | 9/2010 | Hamano | 348/345 |
| 2007/0269127 A1 | 11/2007 | Kusaka | |

FOREIGN PATENT DOCUMENTS

| JP | 10-274562 A | 10/1998 |
| JP | 2000-156823 A | 6/2000 |
| JP | 2000-292686 A | 10/2000 |
| JP | 2007-333720 A | 12/2007 |

OTHER PUBLICATIONS

English Language International Search Report dated Sep. 2, 2008 issued in parent Appln. No. PCT/JP2008/061662.
International Preliminary Report on Patentability dated Feb. 4, 2010 (in English) in parent International Application No. PCT/JP2008/061662.

* cited by examiner

Primary Examiner — Luong T Nguyen
(74) Attorney, Agent, or Firm — Holtz, Holtz, Goodman & Chick, PC

(57) ABSTRACT

An image acquisition apparatus includes a plurality of pupil-division lenses configured to pupil-divide a light flux of the object image light passed through an optical imaging system in an area on a surface of an image sensor, a coordinate recording unit configured to record coordinate information to specify the area on the surface of the image sensor, a correction unit configured to execute, based on an optical characteristic of the plurality of pupil-division lenses corresponding to the area and characteristics of the image sensor, a process of correcting the image signal obtained by the image acquisition operation of the image sensor, according to the recorded coordinate information, and a focus detection unit configured to detect a focal point based on selected one of the image signal before the correction process and the image signal after the correction process.

24 Claims, 16 Drawing Sheets

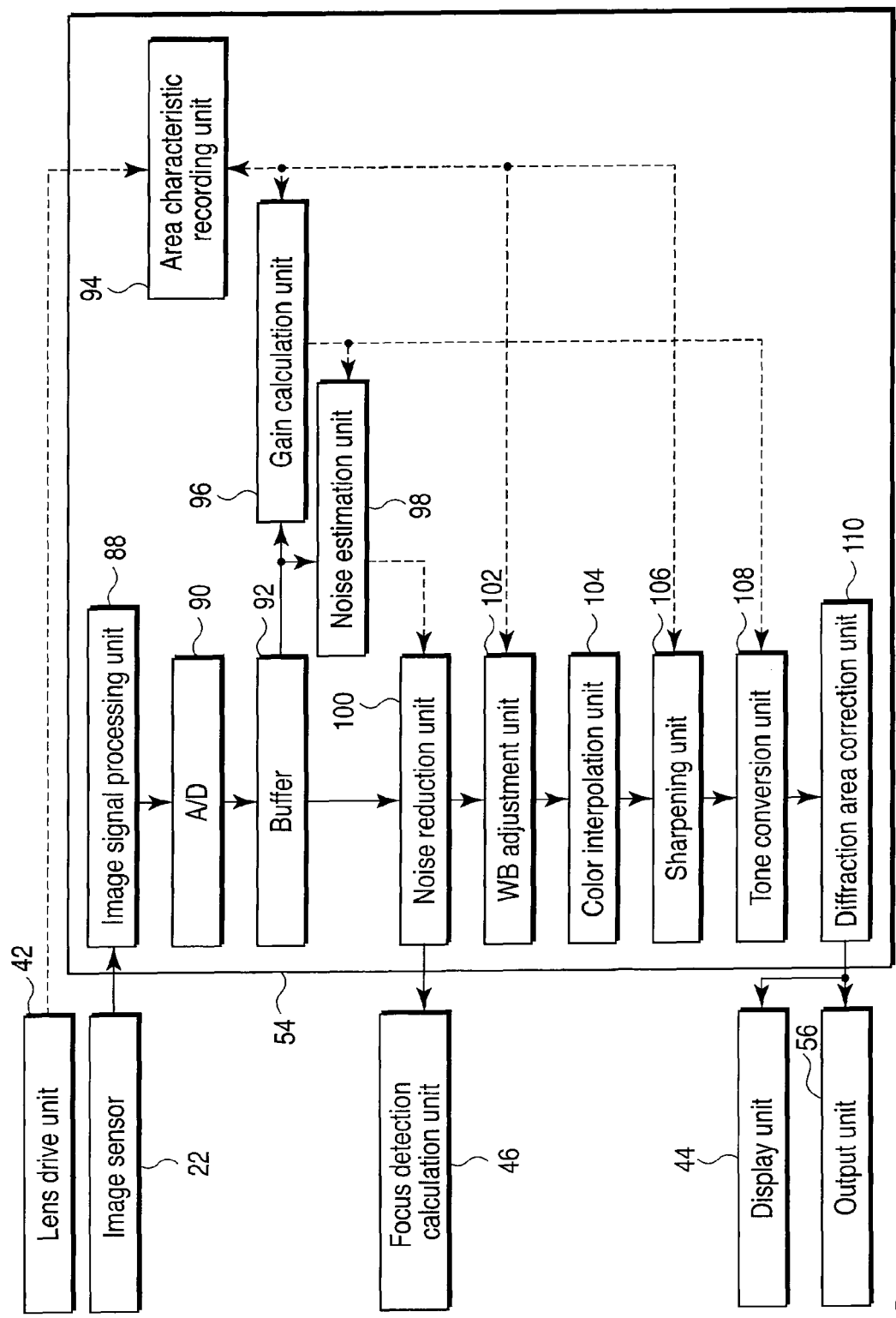
F I G. 7

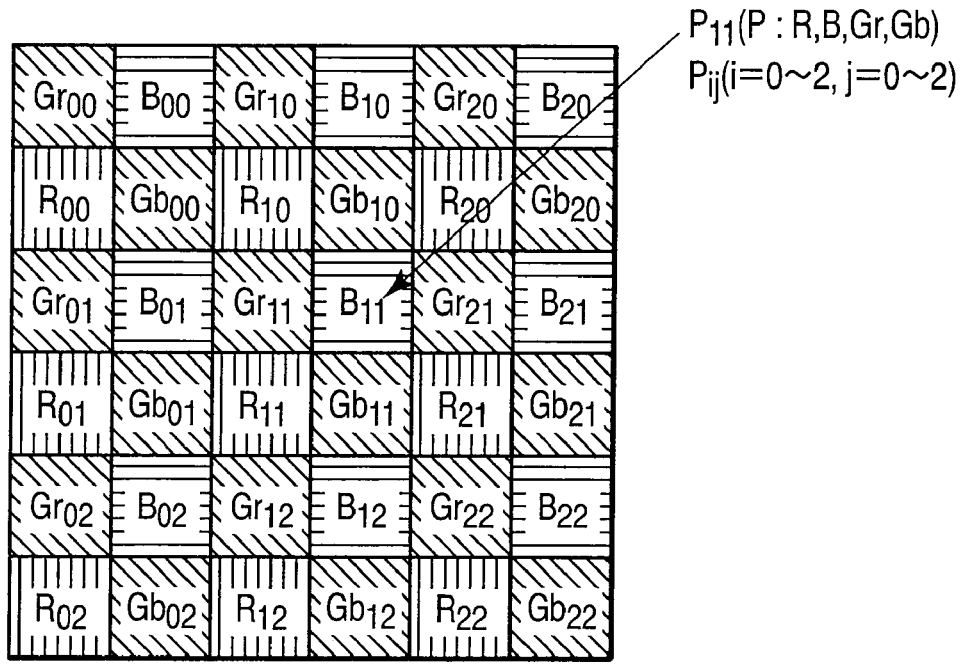
F I G. 8
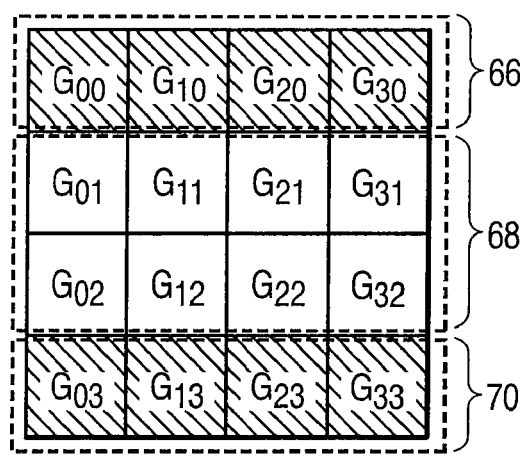
F I G. 9

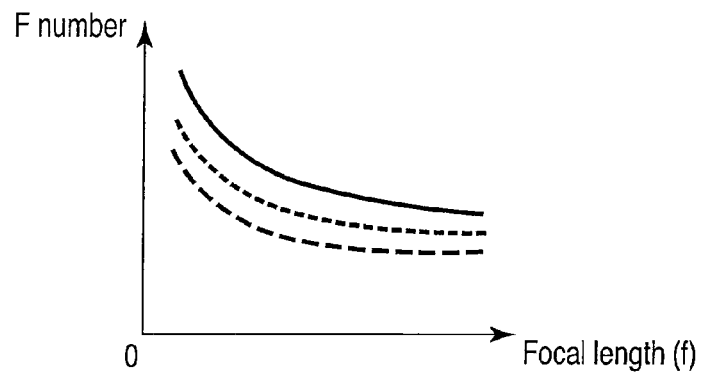
F I G. 11A
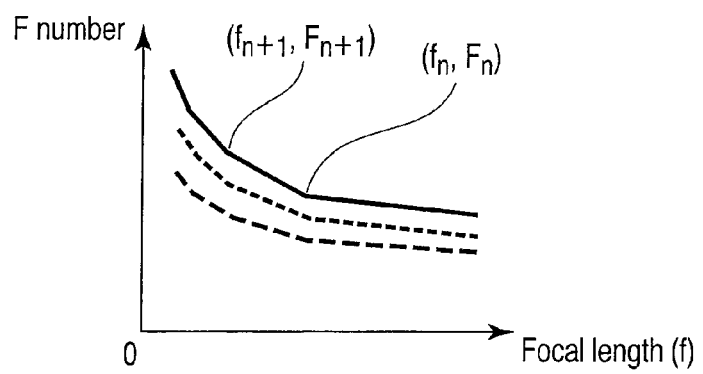
F I G. 11B
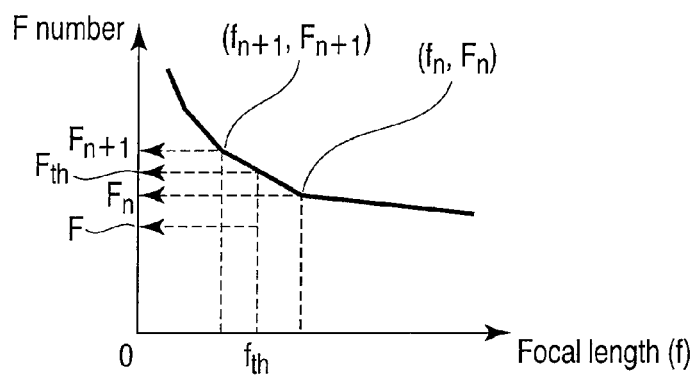
F I G. 11C

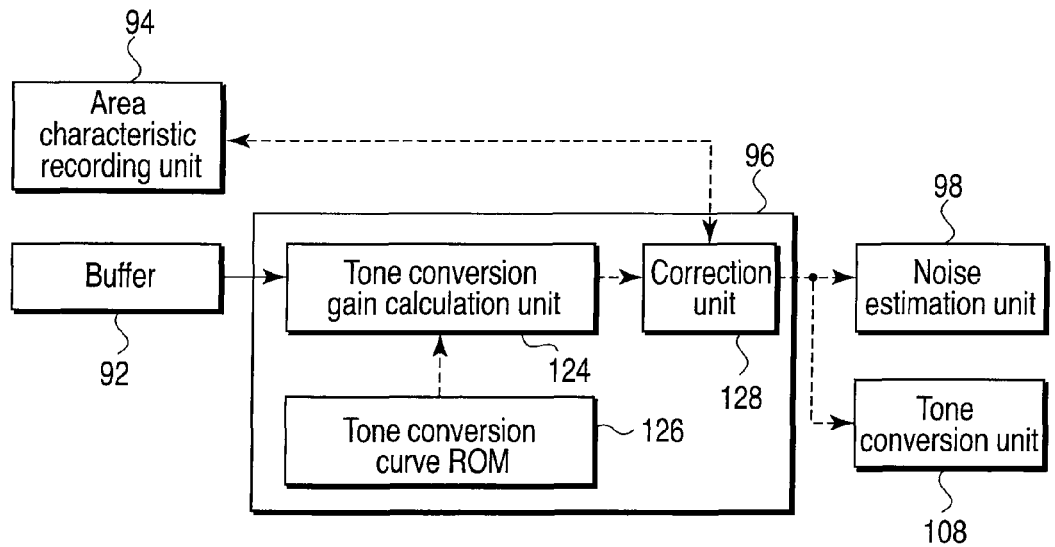
F I G. 13
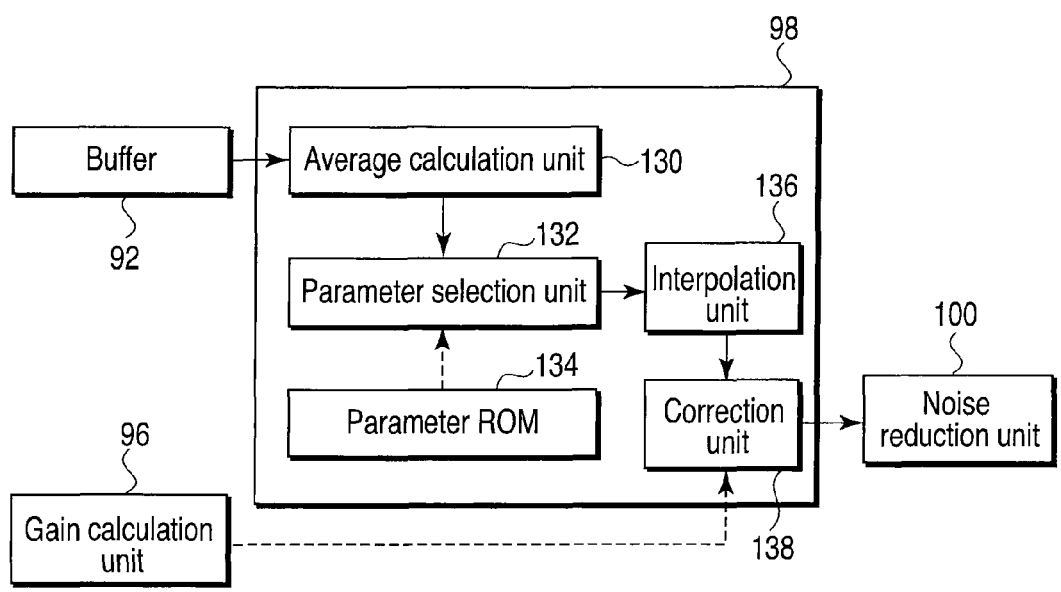
F I G. 14

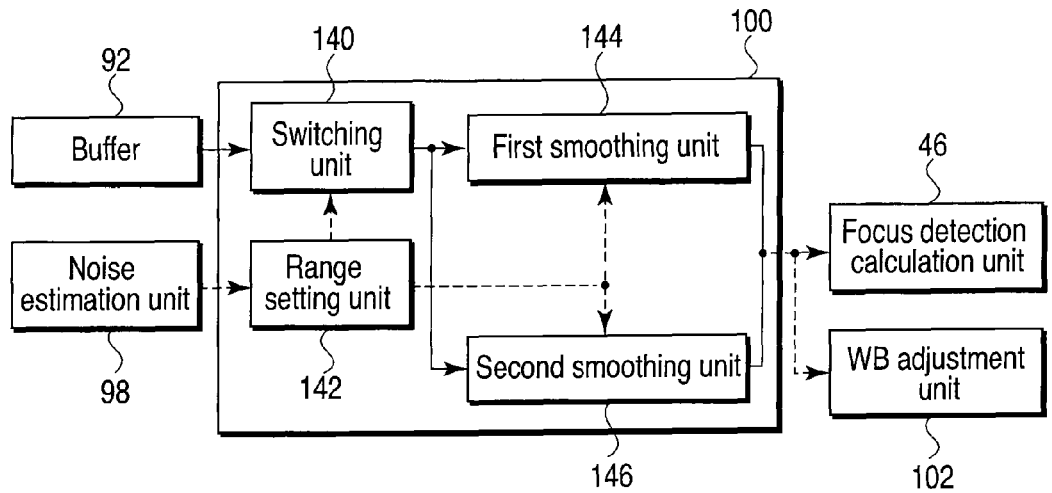
F I G. 16
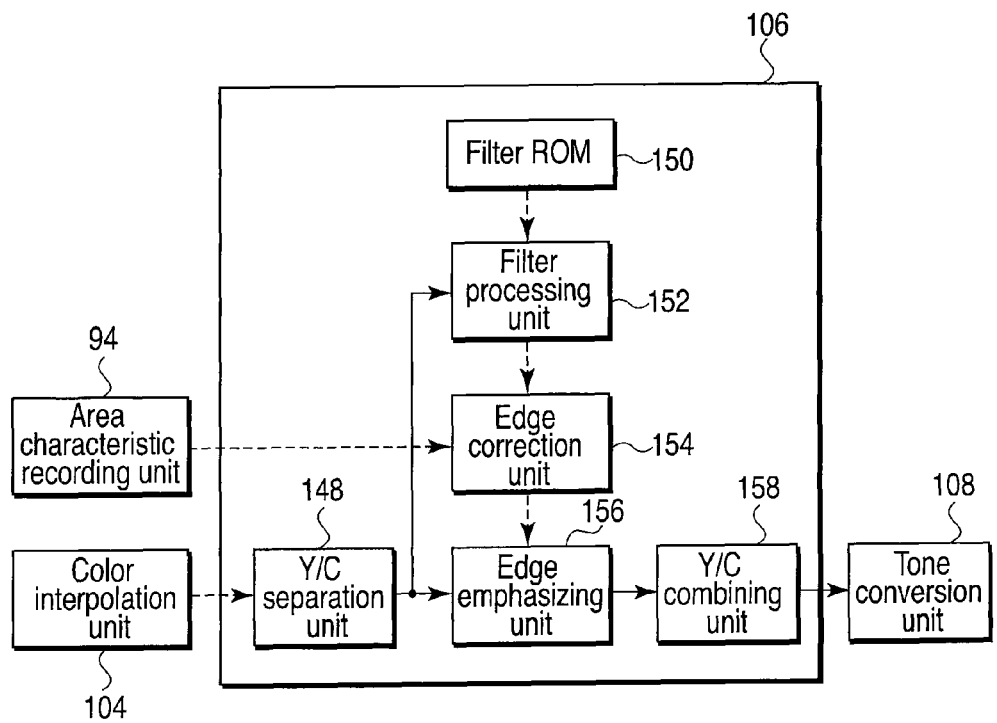
F I G. 17

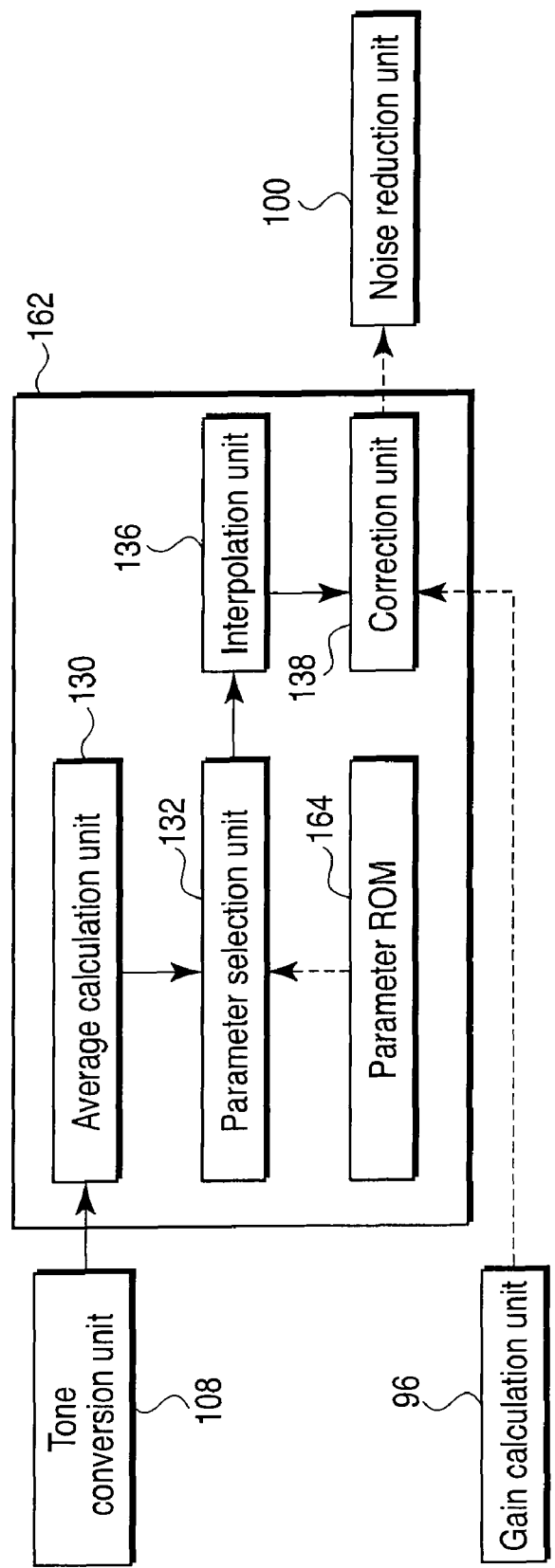
F I G. 20

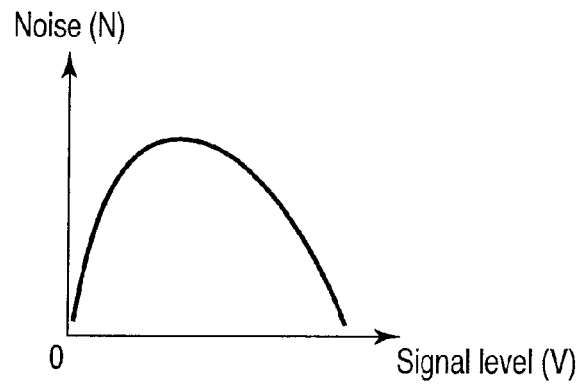
F I G. 21A
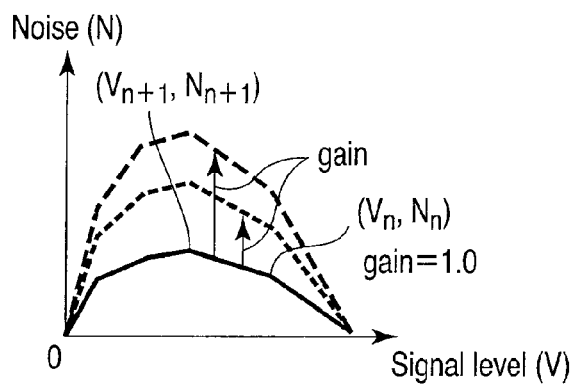
F I G. 21B
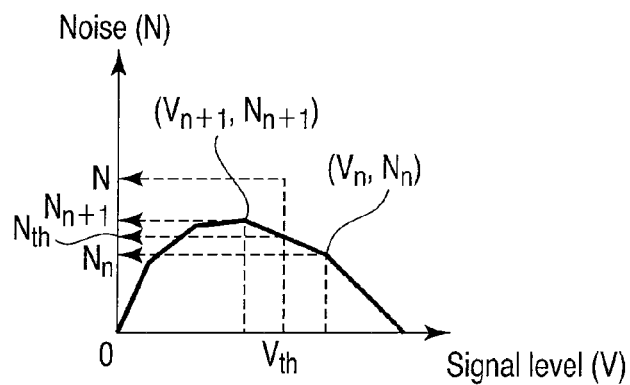
F I G. 21C

IMAGE ACQUISITION APPARATUS WHICH HAS A FOCUS DETECTION FUNCTION AND PROGRAM RECORDING DEVICE

CROSS REFERENCE TO RELATED APPLICATIONS

This is a Continuation Application of PCT Application No. PCT/JP2008/061662, filed Jun. 26, 2008, which was published under PCT Article 21(2) in Japanese.

This application is based upon and claims the benefit of priority from prior Japanese Patent Application No. 2007-170833, filed Jun. 28, 2007, the entire contents of which are incorporated herein by reference.

BACKGROUND OF THE INVENTION

1. Field of the Invention

The present invention relates to an image acquisition apparatus which has a focus detection function and performs an image acquisition operation using an electronic image sensor and a program recording medium having recorded therein a program for causing a computer to process an image signal. In particular, the present invention relates to an accurate focus detection technique and a technique for preventing the degeneration of image quality taking noise characteristics into consideration.

2. Description of the Related Art

Conventionally, various techniques are disclosed for an image acquisition apparatus to electronically capture an object image using an electronic image sensor.

U.S. Pat. No. 4,185,191, for example, discloses a technique for a TTL phase-difference detection device. This is a focus adjustment method called the fly lens method. The light flux passed through a lens array is received by a pair of light-receiving elements making up a line sensor, and by processing the signal of this line sensor, the image shift, i.e., the phase difference is calculated. This phase difference is fed back to the displacement of a focusing lens.

Also, Jpn. Pat. Appln. KOKAI Publication No. 10-274562 discloses a technique for the TTL phase-difference detection device employing the re-focus method.

U.S. Pat. No. 6,781,632 discloses a technique in which a group of minuscule lenses for pupil-dividing the light flux passed through an imaging lens and a group of pairs of light-receiving elements for receiving the light flux pupil-divided by the minuscule lenses are partially formed on the image sensor thereby to configure a focus detection area, and the focus is detected in this focus detection area by the phase-difference detection method.

BRIEF SUMMARY OF THE INVENTION

According to a first aspect of the present invention, there is provided an image acquisition apparatus comprising:

an optical imaging system;

an image sensor configured to acquire an image of an object through the optical imaging system and produce an image signal;

a plurality of pupil-division lenses configured to pupil-divide a light flux of the object image light passed through the optical imaging system in an area on a surface of the image sensor;

a coordinate recording unit configured to record coordinate information to specify the area on the surface of the image sensor;

a correction unit configured to execute, based on an optical characteristic of the plurality of pupil-division lenses corresponding to the area and characteristics of the image sensor, a process of correcting the image signal obtained by the image acquisition operation of the image sensor, according to the coordinate information recorded in the coordinate recording unit; and a focus detection unit configured to detect a focal point based on selected one of the image signal before the correction process and the image signal after the correction process executed by the correction unit.

According to a second aspect of the present invention, there is provided a program recording medium having recorded therein a program for causing a computer to execute:

reading an optical characteristic of a plurality of pupil-division lenses for pupil-dividing a light flux of an object image light passed through an optical imaging system in an area on a surface of an image sensor configured to acquire an image of the object through the optical imaging system and produce an image signal, image acquisition information of the optical imaging system, and the image signal obtained by the image acquisition operation of the image sensor; and correcting the read image signal based on the optical characteristic of the plurality of pupil-division lenses corresponding to the particular area and the characteristic of the image sensor recorded in advance, according to coordinate information recorded in advance for specifying the particular area on the surface of the image sensor.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a block diagram showing the configuration of a signal processing unit.

FIG. 8 is a diagram showing the configuration of a Bayer color filter.

FIG. 9 is a diagram for explaining an example of interpolation of the G signal in the diffraction area.

FIG. 11A is a diagram showing the relationship between a focal length and an F number.

FIG. 11B is a diagram showing the simplified relationship between the focal length and the F number.

FIG. 11C is a diagram for explaining a method of calculating the F number using the relationship shown in FIG. 11B.

FIG. 13 is a block diagram showing an example of the configuration of a gain calculation unit.

FIG. 14 is a block diagram showing an example of the configuration of a noise estimation unit.

FIG. 16 is a block diagram showing an example of the configuration of a noise reduction unit.

FIG. 17 is a block diagram showing an example of the configuration of a sharpening unit.

FIG. 20 is a block diagram showing an example of the configuration of the noise estimation unit according to the second embodiment.

FIG. 21A is a diagram showing the relationship between the signal level and the maximum noise.

FIG. 21B is a diagram showing the simplified relationship between the signal level and the maximum noise.

FIG. 21C is a diagram for explaining a method of calculating the noise using the relationship shown in FIG. 21B.

DETAILED DESCRIPTION OF THE INVENTION

[First Embodiment]

Figure 1:
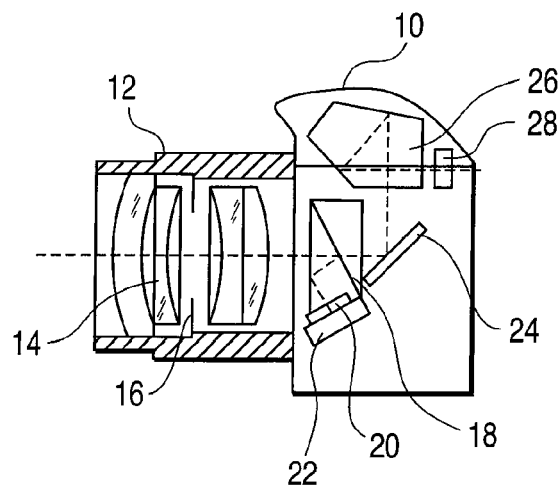
FIG. 1 is a diagram showing the configuration of an optical system of an image acquisition apparatus according to a first embodiment of the invention.

As shown in FIG. 1, the image acquisition apparatus according to the first embodiment of the invention is a single-lens reflex camera. This image acquisition apparatus includes a camera housing 10 and an optical imaging system 12 mounted replaceably or fixed on the camera housing 10.

The optical imaging system 12 is configured of a focusing lens 14, an aperture stop 16, etc. The focusing lens 14 for receiving the light from an object is arranged at a predetermined position, and the aperture stop 16 on the optical axis thereof. It should be noted that the aperture stop 16 is adapted to hold a predetermined aperture and has the shutter function to completely shut out the light at the same time.

In the camera housing 10, a beam splitter 18 is arranged on the optical path of the object light through the optical imaging system 12. A microlens array 20 and an image sensor 22 are arranged on the optical path of the light reflected from the beam splitter 18. Also, a finder optical system including a mirror 24, a pentaprism 26 and an eyepiece 28 is arranged on the optical path of the light transmitted through the beam splitter 18.

In this configuration, a part of the light flux from the object passed through the optical imaging system 12 is reflected downward by the beam splitter 18 and detected by the image sensor 22. Also, a part of the light flux from the object transmitted through the beam splitter 18, after being reflected on the mirror 24, is led to the finder optical system configured of the pentaprism 26, the eyepiece 28, etc., and observed by a photographer.

Figure 2:
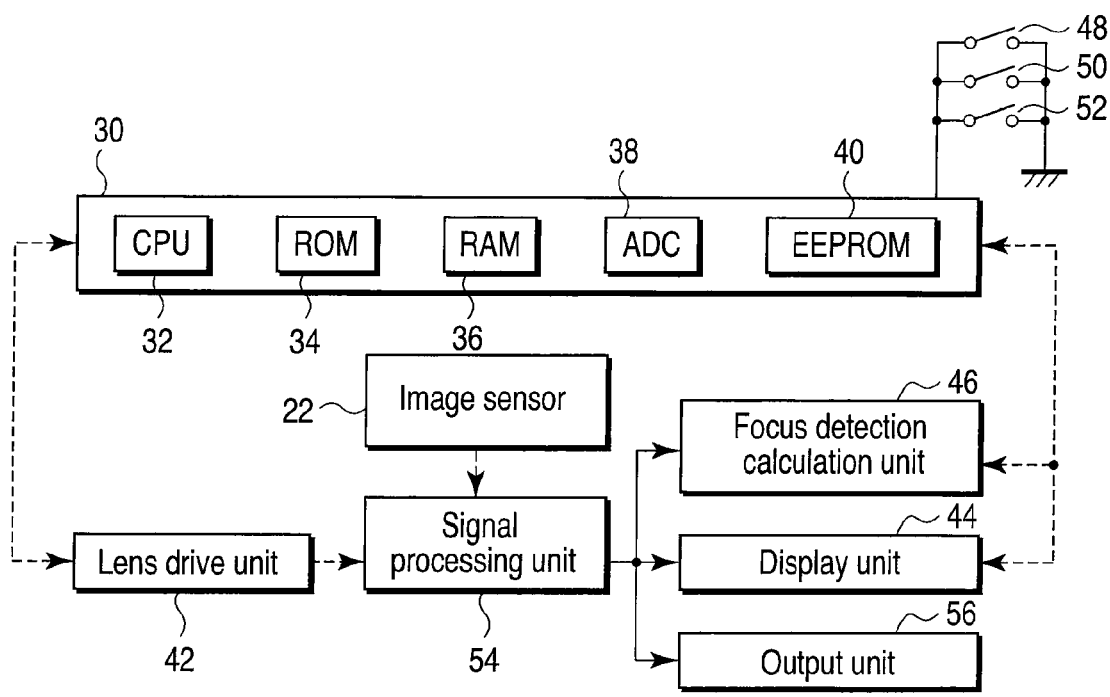
FIG. 2 is a diagram showing the configuration of a signal processing system of the image acquisition apparatus according to the first embodiment.

Also, as shown in FIG. 2, this image acquisition apparatus includes a system controller 30. The system controller 30 includes at least a central processing unit (CPU) 32 for controlling the whole system, a read-only memory (ROM) 34, a random access memory (RAM) 36, an analog-to-digital converter (ADC) 38 and an EEPROM 40 which is a nonvolatile memory. Further, the system controller 30 is connected bidirectionally with a lens drive unit 42, a display unit 44, a focus detection calculation unit 46, a first release switch (hereinafter referred to as 1RSW) 48, a second release switch (hereinafter referred to as 2RSW) 50 and an area selection SW 52.

The output of the image sensor 22 is connected to the input of a signal processing unit 54. The output of the signal processing unit 54 is connected to the input of an output unit 56, the display unit 44 and the focus detection calculation unit 46.

In this configuration, the system controller 30 performs a series of operations in accordance with the sequence program stored in the ROM 34 built therein. Also, the EEPROM 40 in the system controller 30 has stored therein the correction data on focus adjustment, light measurement and exposure calculation, and AWB (auto white balance) for each image acquisition apparatus.

The image sensor 22 acquires an image of an object formed by the optical imaging system 12 and converts it into an electrical signal. The signal processing unit 54 generates an image signal by processing the electrical signal constituting pixel signals from the image sensor 22. The detailed configuration of the signal processing unit 54 is described later.

The focus detection calculation unit 46 performs the arithmetic operation to detect the focal point based on the image signal processed by the signal processing unit 54. As the result of this focus detection calculation, the in-focus determination data and the drive degree of the focusing lens 14 are transmitted to the system controller 30.

In the display unit 44, the image acquired by the image sensor 22 and the information in the camera are displayed by a liquid crystal display element (LCD) or the like under the control of the system controller 30. Also, the output unit 56, though not specifically shown, is configured of a compression/decompression circuit and a recording medium so that the image acquired by the image sensor 22 is compressed and recorded in the recording medium.

The 1RSW 48 and 2RSW 50 are switches operatively interlocked with a release button not shown. Specifically, the 1RSW 48 is turned on by the first-stage depression of the release button, followed by the 2RSW 50 being turned on by the second-stage depression thereof. The area selection SW 52 is a switch for selecting the AF area, and each time it is turned on, selects while moving the predetermined AF area. The system controller 30 detects the focal point and performs the AF operation with the 1RSW 48 turned on, and performs the image acquisition and recording operation with the 2RSW 50 turned on.

In addition, the lens drive unit 42, based on the command from the system controller 30, drives the focusing lens 14, the aperture stop 16, etc., and controls the state of the optical imaging system 12 including the focal length and the aperture stop diameter.

It should be noted that, in FIG. 2 and each drawing explained below, the solid arrow between the processing units indicates the flow of the signal of the image acquired and the dashed arrow the flow of the control signal.

Figure 3:
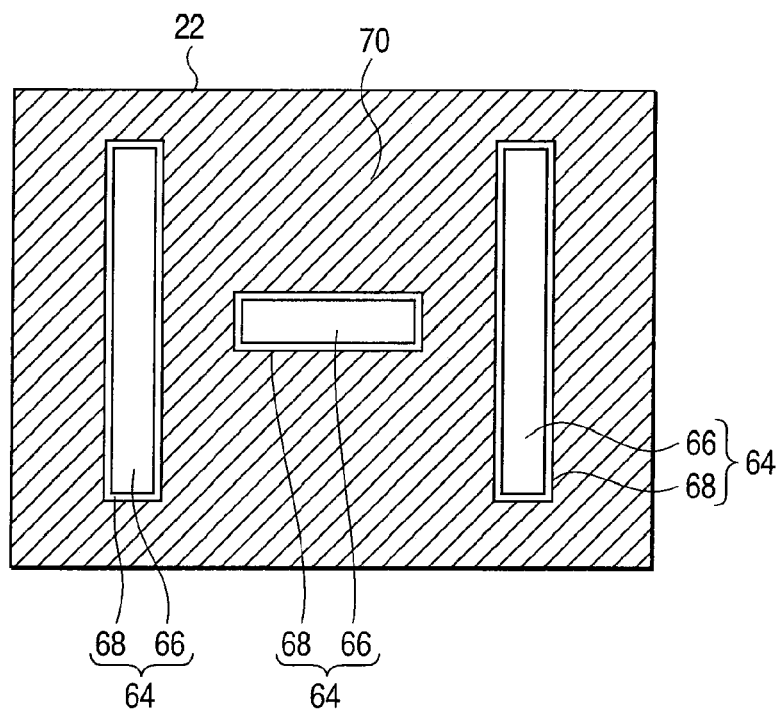
FIG. 3 is a diagram showing the arrangement and configuration of a microlens array and an image sensor.

The microlens array 20 and the image sensor 22 are arranged in the configuration shown in FIG. 3. Also, the cross section of the microlens array 20 and the image sensor 22 in the focus detection area (described later) is configured as shown in FIG. 4.

Figure 4:
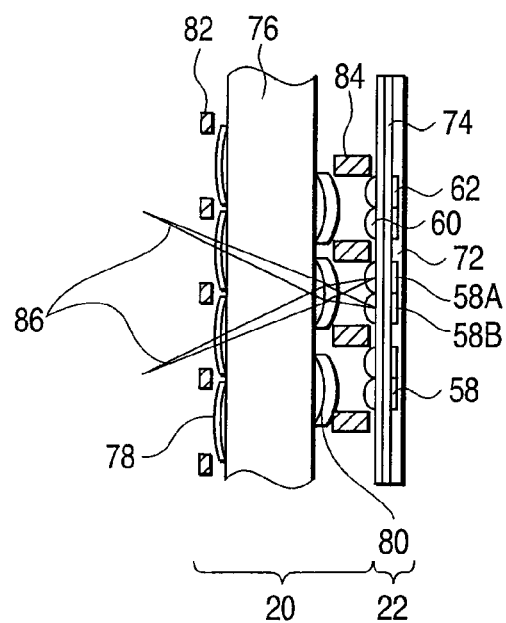
FIG. 4 is a diagram showing the sectional configuration of the microlens array and the image sensor in a focus detection area.

Specifically, as shown in FIG. 4, a microlens 60 is formed on the front surface of a photodiode 58 making up the light-receiving element. As a technique for improving the light sensitivity of the image sensor 22, the technique of what is called the on-chip microlens is established. According to this technique, the provision of each microlens 60 at a position corresponding to each photodiode 58 makes it possible to efficiently condense the incident light on a light-receiving portion 62 of each photodiode 58. The microlenses 60 are set to optimize the optical sensitivity on the surface of the image sensor 22 as described above.

Apart from the condensing microlenses 60, as shown in FIG. 3, a microlens array 20 for focus detection is arranged in a predetermined area on the surface of the image sensor 22.

In the description that follows, the area including the light-receiving elements covered with the microlens array 20 is referred to as a microlens array area 64. Also, that part of the microlens array area 64 in which only the light flux passed through the microlens array 20 is focused is referred to as a focus detection area 66 to generate the image signal for focus detection. Further, the part of the microlens array area 64, which is located in the neighborhood of the focus detection area 66 and in which the light is diffracted by the microlens array 20 after passing through the optical imaging system 12 so that the light flux circumvents under the microlens array 20 from outside of the microlens array 20 without passing through the microlens array 20 and forms an image, is referred to as a diffraction area 68. Furthermore, the part of the microlens array area 64 in which the light flux passes through only the optical imaging system 12 and entirely free from the effect of the microlens array 20 is referred to as an image acquisition area 70.

According to this embodiment, as shown in FIG. 3, three microlens array areas 64 are formed. Specifically, each microlens array 20 is so configured that one focus detection area 66 is arranged on the optical axis on the surface of the image sensor 22, and the other two focus detection areas 66 are arranged outside of the optical axis in the direction perpendicular to the focus detection area arranged on the optical axis.

In this case, the positions of these areas are rendered to correspond to the coordinates of the pixels on the surface of the image sensor 22. The microlens array area 64 and the image acquisition area 70 can be easily rendered to correspond to the coordinates based on the position of the microlens array 20 relative to the position of the image sensor 22. The focus detection area 66 and the diffraction area 68 are rendered to correspond so by the actual measurement or simulation by tracking light rays, etc.

The image sensor 22 in the focus detection area 66, as shown in FIG. 4, includes photodiodes 58 each having the light-receiving portion 62 formed of a diffusion layer or the like in a semiconductor substrate 72 of silicon. The image sensor 22 further includes a color filter 74 formed on the light-receiving portion 62 and microlenses 60 each formed on the color filter 74 and having a spherical surface of a predetermined radius of curvature and a focal length corresponding in one-to-one relationship to the light-receiving portion 62.

Also, the microlens array 20 arranged in the focus detection area 66 is configured to hold a transparent layer 76 between condenser lenses 78 and re-focus lenses 80. A visual field mask 82 is formed between the adjacent lenses on the surface of each condenser lens 78, and a mask 84 for preventing crosstalks is formed between the adjacent lenses on the surface of each re-focus lens 80. Each re-focus lens 80 is formed to have an optical axis equidistant from the adjacent condenser lenses 78. The microlens array 20 is arranged in such a manner that each re-focus lens 80 covers the two adjacent photodiodes 58 on the surface of the image sensor 22.

Assume that photodiodes 58A, 58B as a pair of the light-receiving elements are arranged substantially on the focal plane of the microlens array 20. In such a case, the microlens array 20, as shown in FIG. 4, operates in such a manner that the light flux passing through the optical imaging system 12 is pupil-divided and the divided light fluxes 86 enter the pair of the photodiodes 58A, 58B, respectively.

It should be noted that the image acquisition area 70 of the image sensor 22 has a cross section in such a form that the microlens array 20 is removed from FIG. 4.

Figure 5:
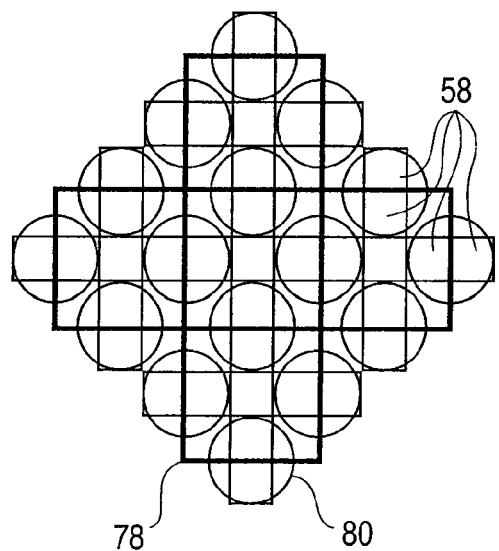
FIG. 5 is a diagram showing the arrangement of photodiodes making up light-receiving elements, condenser lenses and re-focus lenses on the image sensor as viewed along the optical axis.

The photodiodes 58 constituting the light-receiving elements, the condenser lenses 78 and the re-focus lenses 80 on the image sensor 22 are arranged as shown in FIG. 5 as viewed in the direction along the optical axes thereof.

It should be noted that the principle of focus detection is similar to that of the phase-difference detection method disclosed in U.S. Pat. No. 4,185,191 described above, and therefore, not described in detail here.

Figure 6:
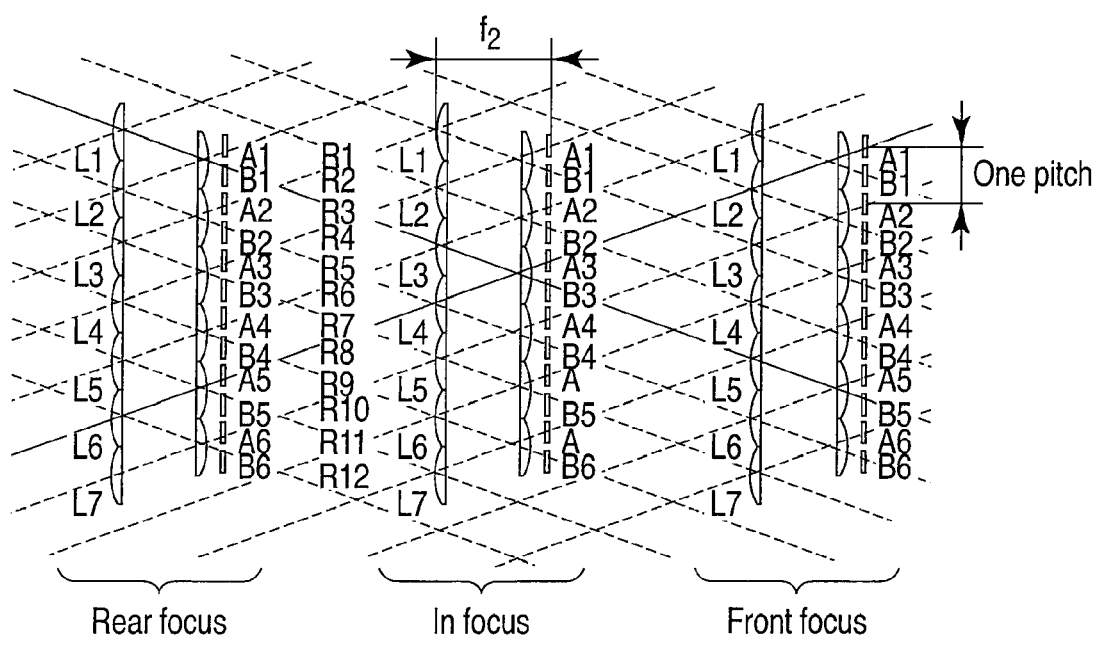
FIG. 6 is a diagram for explaining the relative positions of the microlens array, the light-receiving element group and the optical imaging system at the in-focus state, the front focus and the rear focus.

Next, the arithmetic operation for focus detection by the focus detection calculation unit 46 is explained with reference to each case involving the in-focus state, the front focus and the rear focus shown in FIG. 6. It should be noted that the microlens array Ln and the light-receiving elements An, Bn are actually fixed, while the position of the optical imaging system 12 moves. For the convenience of explanation, however, the relative positions are explained here assuming that the position of the optical imaging system 12 is fixed.

The focal length of the microlens array Ln is f2, and substantially equals to the distance between the microlens array Ln and each of the light-receiving elements (photodiode 58) An, Bn. Light rays R1 to R12 are light fluxes from the same object but passed through different emission pupils.

As long as the image is in focus, the light-receiving elements An, Bn adjacent to each other on both sides of the optical axis of each microlens array Ln receive the same amount of received light. For example, the microlens array L3, L4 and the light-receiving elements A3, B3 correspond to the light rays R3, R8.

In the front focus state, the amount of the light received by the light-receiving elements A, B through different microlens arrays, i.e., the amount of the light received by the light-receiving elements not adjacent to each other correspond to each other. For example, the microlens array L5 and the light-receiving element, and the microlens array L2 and the light-receiving element A1 correspond to the light rays R3, R8 from the same object, respectively. Therefore, the image is shifted by four pitches.

In the rear focus state, on the other hand, the detection elements receiving the same amount of received light are adjacent to each other, but the light entering these adjacent light-receiving elements are passed through different microlens arrays. For example, the microlens array L1 and the light-receiving element B1, and the microlens array L6 and the light-receiving element A5 correspond to the light rays R3, R8 from the same object, respectively. Therefore, the image is shifted by four pitches in the opposite direction to the one in the front focus state.

As described above, the image is shifted in accordance with the focusing error. Actually, the focus detection accuracy is reduced for the image shift (phase difference) by pitch described above, and therefore, the focal point is detected for one pitch or less by executing the process such as the well-known interpolation operation. By detecting the image shift in this way, the focusing error of the imaging lens can be determined.

Also, a process using the well-known algorithm can be executed in which the focal point is detected for a plurality of focus detection areas 66 and an object at the shortest distance is automatically selected out of them. The photographer can focus the image in the particular area by selecting the AF area using the area selection SW 52.

The signal processing unit 54, as shown in FIG. 7, includes an image signal processing unit 88, an analog-to-digital (A/D) converter 90, a buffer 92, an area characteristic recording unit 94, a gain calculation unit 96, a noise estimation unit 98, a noise reduction unit 100, a WB adjustment unit 102, a color interpolation unit 104, a sharpening unit 106, a tone conversion unit 108 and a diffraction area correction unit 110.

The lens drive unit 42 is connected to the area characteristic recording unit 94.

Also, the image sensor 22 is connected to the image signal processing unit 88. The image signal processing unit 88 is connected to the buffer 92 through the A/D converter 90. The area characteristic recording unit 94 is bidirectionally connected to the gain calculation unit 96, the WB adjustment unit 102, the color interpolation unit 104 and the sharpening unit 106. The buffer 92 is connected to the gain calculation unit 96, the noise estimation unit 98 and the noise reduction unit 100. The gain calculation unit 96 is connected to the noise estimation unit 98 and the tone conversion unit 108. The noise reduction unit 100 is connected to the focus detection calculation unit 46 and the WB adjustment unit 102. The WB adjustment unit 102 is connected to the color interpolation unit 104. The color interpolation unit 104 is connected to the sharpening unit 106. The sharpening unit 106 is connected to the tone conversion unit 108. The tone conversion unit 108 is connected to the diffraction area correction unit 110. The diffraction area correction unit 110 is connected to the display unit 44 and the output unit 56.

Now, the signal flow is explained with reference to FIG. 7.

The image sensor 22 is assumed to be a single CCD with the Bayer primary color filter arranged over the entire surface thereof as shown in FIG. 8. The Bayer color filter, formed of (2×2) pixels as a basic unit, includes one pixel for each of the red (R) and blue (B) filters and two pixels for the green (G) filter. According to this embodiment, the G pixels are arranged above and under each of the R and B pixels as Gr and Gb pixels, respectively.

The focusing in the focus detection area 66 is affected by the microlens array 20. The focusing in the total optical system including the optical imaging system 12, therefore, as compared with the focusing in the image acquisition area 70 on which only the optical imaging system 12 works, is different in such optical characteristics as the focal length, the F number, the lens resolution (hereinafter referred to as the resolution MTF) and the lens transmittance. According to this embodiment, taking this difference in the focusing conditions from one area to another into consideration, the image signal associated with the focus detection area 66 is corrected using the characteristic data of the optical imaging system 12 and the microlens array 20. Also, the image signal associated with the diffraction area 68 is generated by interpolation from the image signals associated with the focus detection area 66 and the image acquisition area 70.

According to this embodiment, the F number, the resolution MTF and the WB coefficient related to the optical imaging system 12 and the microlens array 20 are recorded as the characteristic data described above. These characteristic data of the optical system are determined in advance by actual measurement or the simulation such as light ray tracking, and recorded in the area characteristic recording unit 94 together with the position (coordinate) data of the focus detection area 66 and the diffraction area 68 in a manner adapted to be accessed at the time of image acquisition. The characteristic data and the area characteristic recording unit 94 are described in detail later.

Specifically, in the beginning of the image acquisition operation, the 1RSW 48 is turned on by the first-stage depression of the release button thereby to enter a pre-image acquisition mode to detect the focal point and perform the AF operation. In the pre-image acquisition mode, the signal processing unit 54 generates an image signal for the purpose of arithmetic operation for detecting the focal point, and this image signal is transferred to the focus detection calculation unit 46.

More specifically, the signal produced by the image sensor 22 is transmitted to the image signal processing unit 88 of the signal processing unit 54 and subjected to the processing such as correlated double sampling (CDS)/differential sampling and the analog gain adjustment. The signal thus processed is converted to a digital image signal by the A/D converter 90 and transferred to the buffer 92. The image signal in the buffer 92 is transferred to the noise estimation unit 98 and the noise reduction unit 100. In the pre-image acquisition mode, however, the image signal is not transferred from the buffer 92 to the gain calculation unit 96.

The noise estimation unit 98 estimates the noise corresponding to the signal level of each pixel based on the noise characteristic of the image sensor 22. In the pre-image acquisition mode, the estimated noise is transferred to the noise reduction unit 100. In the noise reduction unit 100, the signal from the buffer 92 is subjected to a coring operation based on the noise estimated by the noise estimation unit 98 thereby to reduce the noise. The processes of estimating the noise and reducing the noise are descried in detail later.

The image signal reduced in noise is transmitted from the noise reduction unit 100 to the focus detection calculation unit 46. In the focus detection calculation unit 46, the phase difference is calculated based on the image signal associated with the focus detection area 66 thereby to detect the focal point. It should be noted that, according to this embodiment, the phase difference is calculated based on the Bayer green (G) signal. Alternatively, however, after conversion to the RGB images by the well-known color interpolation process, the brightness signal may be generated and the focal point may be detected based on the brightness signal.

Also, in order to increase the processing speed, without detecting the focal point based on the image signal after the noise reduction process, the image signal may be transferred from the buffer 92 directly to the focus detection calculation unit 46 to detect the focal point.

In this pre-image acquisition mode, the photographer moves and selects the AF area by the area selection SW 52 as required, and by focusing the camera on an arbitrary object or changing the image acquisition information (such as the focal length of the optical system and the aperture stop), adjusts to the optimum image acquisition conditions.

The aforementioned process is followed by the second-stage depression of the release button to turn on the 2RSW 50 thereby to start the main image acquisition process. As in the pre-image acquisition mode, the image signal produced by the image sensor 22 is converted into a digital image signal through the image signal processing unit 88 and the A/D converter 90 and transferred to the buffer 92. The image signal in the buffer 92 is transferred to the gain calculation unit 96, the noise reduction unit 100 and the noise estimation unit 98.

In the gain calculation unit 96, the amplification factor of the signal level for each pixel in the last-stage tone conversion process is calculated in advance as a gain. Because of the effect of the microlens array 20, different F numbers of the optical system work on the focus detection area 66 and the image acquisition area 70, with the result that different gains are generated for the same signal level. With regard to the pixels associated with the focus detection area 66, therefore, the F numbers for the focus detection area 66 and the image acquisition area 70 are acquired from the area characteristic recording unit 94 and the gain is calculated based on the F numbers as well as the signal level. With regard to the pixels associated with the image acquisition area 70, on the other hand, the gain is calculated based on the signal level. The gains thus calculated are transferred to the noise estimation unit 98 and the tone conversion unit 108. This gain calculation process is descried in detail later.

In the noise estimation unit 98, the intended areas $P_{ij}$ (i=0 to 2; j=0 to 2) of the (3×3) pixel size containing the intended pixel $P_{11}$ (P: pixel of each of R, Gr, Gb and B) by color as shown in FIG. 8 are sequentially extracted. After that, as disclosed in U.S. Patent Application Publication No. 2006/0227227, the noise N for the intended pixel $P_{11}$ is estimated from the model of the noise based on the image sensor characteristic corresponding to the signal level. It should be noted that, although the noise reduction unit 100 adjusts the noise reduction effect by the coring process based on the noise N, good noise estimation is actually difficult, and therefore, the noise remains even after the noise reduction process. The residual noise is amplified by the gain multiplication in the last-stage tone conversion unit 108. Taking it for granted that the noise remains, therefore, the noise is corrected by estimating it somewhat upward in the area having a large gain to effectively adjust the noise reduction effect. In the case under consideration, the noise, after being calculated based on the signal level, is corrected by multiplying a weighted gain and transferred to the noise reduction unit 100. The noise calculation is described in detail later.

The noise reduction unit 100 executes the smoothing process by coring based on the noise N estimated by the noise estimation unit 98. The image signal after noise reduction is transferred to the WB adjustment unit 102.

The WB adjustment unit 102 multiplies the image signal by a predetermined white balance coefficient for each color signal.

Assume that the spectral characteristic of the microlens array 20 is different from that of the optical imaging system 12. In this case, the white balance coefficient is different between the focus detection area 66 and the image acquisition area 70. According to this embodiment, therefore, the white balance coefficients calculated in advance by the actual measurement or such a method as the light ray tracking simulation for the focus detection area 66 and the image acquisition area 70 are recorded in the area characteristic recording unit 94.

The WB adjustment unit 102 transfers the coordinates of the intended pixel to the area characteristic recording unit 94, which in turn, after determination for the area based on the coordinates, transfers the white balance coefficient for the particular area to the WB adjustment unit 102. The WB adjustment unit 102 multiplies the signal level of the intended pixel by the white balance coefficient transferred thereto, thereby making the WB adjustment.

The image signal after WB adjustment is transferred to the color interpolation unit 104, and after generating the image signal having three color signals of R, G, B by the well-known interpolation process, transferred to the sharpening unit 106.

In the sharpening unit 106, after the edge signal extracted by the filter process, the edge signal is added to the original signal thereby to execute the sharpening process. Because of the effect of the microlens array 20, the focus detection area 66 and the image acquisition area 70 have different resolutions MTF. In each area low in resolution, therefore, the subjective impression of resolution is required to be balanced by adding the edge signal in emphasized form. According to this embodiment, therefore, the first step is to calculate the resolution MTF by actual measurement or such a simulation method as the light ray tracking for each of the image acquisition area 70 and the focus detection area 66 affected by the microlens array 20, and the resolution MTFs thus calculated are recorded in the area characteristic recording unit 94.

The coordinates of the intended pixel are transferred from the sharpening unit 106 to the area characteristic recording unit 94, and by accessing the area information, the area associated with the intended pixel is specified. In the case where the intended pixel is associated with the focus detection area 66, the resolution MTFs corresponding to the focus detection area 66 and the image acquisition area 70 are acquired. In the sharpening unit 106, the product of the ratio of the acquired resolution MTFs and the edge signal together with a predetermined coefficient is added to the original signal to sharpen the image. This sharpening process is explained in detail later.

The image signal thus sharpened is transferred to the tone conversion unit 108. In the tone conversion unit 108, the gain corresponding to each pixel calculated in the gain calculation unit 96 is multiplied for each color signal thereby to execute the tone conversion process, and the image signal after conversion is transferred to the diffraction area correction unit 110.

It should be noted that processes for the pixels associated with the diffraction area 68 which is included in the processes up to the tone conversion unit 108 described above are all skipped.

In the diffraction area correction unit 110, the pixel intensity associated with the diffraction area 68 is interpolated by a well-known interpolation process, based on the pixel intensities associated with the focus detection area 66 and the image acquisition area 70 in the neighborhood of the diffraction area 68.

An example of this interpolation process is explained with reference to the G signal in the diffraction area 68. As shown in FIG. 9, G11, for example, is interpolated by the linear interpolation based on Equation 1, below, using the upper and lower pixel intensities (G10, G13).

$$G11 = 0.75 \times G10 + 0.25 \times G13 \quad (1)$$

After interpolating the pixel intensity of each color signal associated the diffraction area 68 in this way, the image signal is transferred to the output unit 56 and the display unit 44.

In the output unit 56, the image signal from the tone conversion unit 108 is compressed by the compression/decompression circuit, after which the image signal (still image data) is recorded in the recording medium.

Next, each processing unit making up the signal processing unit 54 is explained in detail.

Figure 10:
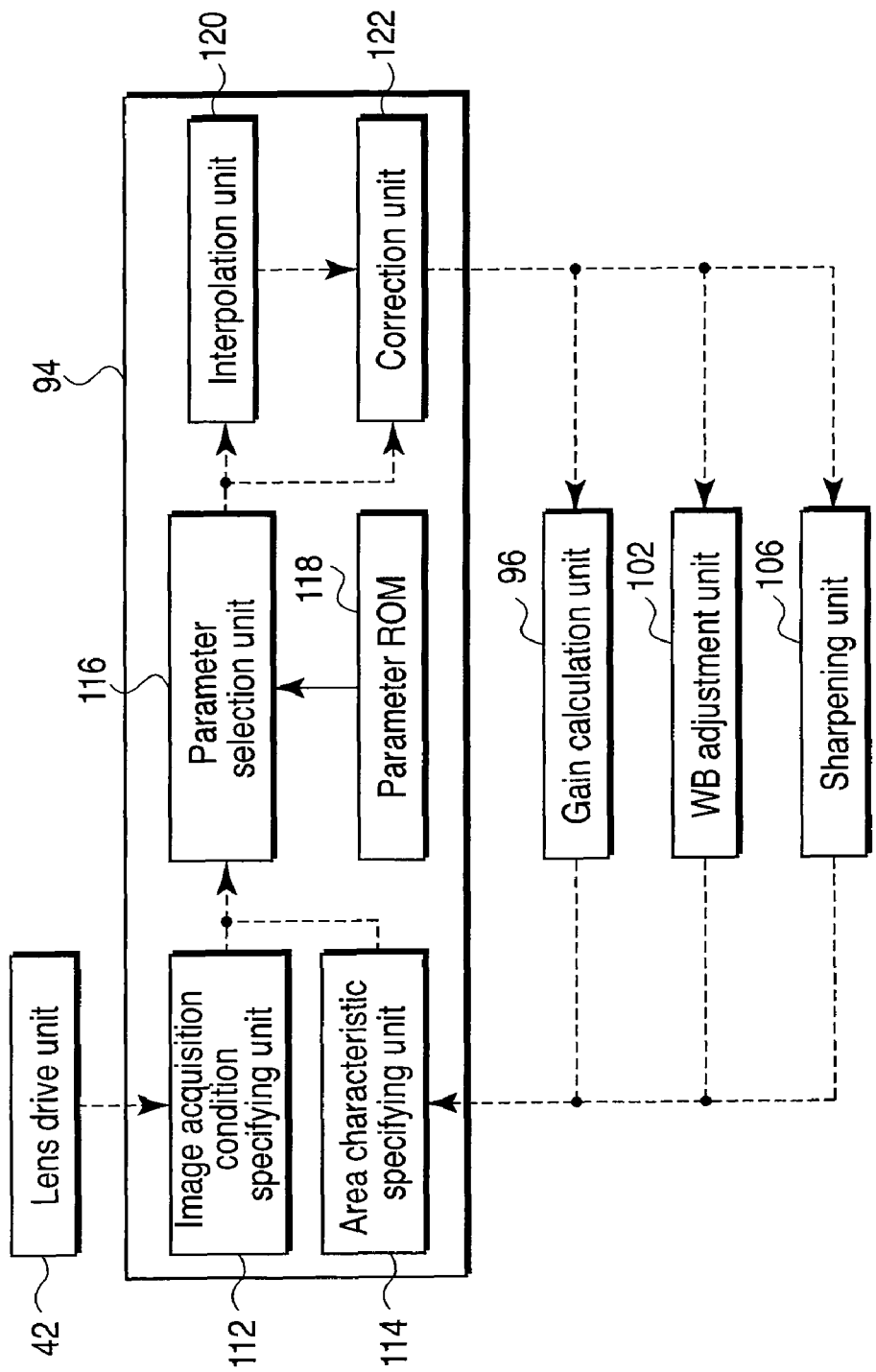
FIG. 10 is a block diagram showing an example of the configuration of an area characteristic recording unit.

The area characteristic recording unit 94, as shown in FIG. 10, for example, includes an image acquisition condition specifying unit 112, an area characteristic specifying unit 114, a parameter selection unit 116, a parameter ROM 118, an interpolation unit 120 and a correction unit 122.

The lens drive unit 42 is connected to the image acquisition condition specifying unit 112. Also, the gain calculation unit 96, the WB adjustment unit 102 and the sharpening unit 106 are connected to the area characteristic specifying unit 114. The image acquisition condition specifying unit 112, the area characteristic specifying unit 114 and the parameter ROM 118 are connected to the parameter selection unit 116. The parameter selection unit 116 is connected to the interpolation unit 120. The interpolation unit 120 is connected to the correction unit 122. The correction unit 122 is connected to the gain calculation unit 96, the WB adjustment unit 102 and the sharpening unit 106.

The area characteristic recording unit 94 holds the characteristic data on the optical imaging system 12 and the microlens array 20. The area characteristic recording unit 94 thus supplies to the external processing units including the gain calculation unit 96, the WB adjustment unit 102 and the sharpening unit 106, with the characteristic data required by them.

The characteristic data in store include the F number, the resolution MTF and the spectral characteristic of the lens indicating the optical characteristics of the optical imaging system 12 affecting the focusing of the image acquisition area 70. The characteristic data also including the F number, the resolution MTF and the spectral characteristics indicating the optical characteristics of the optical system as a combination of the microlens array 20 and the optical imaging system 12 affecting the focusing of the focus detection area 66 are stored together with the coordinate data of the focus detection area 66. Further, the WB coefficient related to the spectral sensitivity of the image sensor 22 is stored together with the coordinate data of the focus detection area 66.

Thus, the area characteristic recording unit 94 specifies an area from the coordinates of the intended pixel input from the processing unit, and outputs the characteristic data corresponding to any one of the image acquisition area 70 and the focus detection area 66 required by the processing unit.

Specifically, as the first step, the image acquisition information (focal length, aperture stop diameter, etc., of the optical imaging system 12) set in pre-image acquisition mode are transferred to and recorded in the image acquisition condition specifying unit 112 by the lens drive unit 42. This image acquisition information is held until the main image acquisition process is finished.

The area characteristic specifying unit 114, which has stored therein the coordinate information indicating the focus detection area 66, the image acquisition area 70 and the diffraction area 68 in advance, determines which of the focus detection area 66, the image acquisition area 70 and the diffraction area 68 is associated with the particular coordinates, based on the coordinates input from the processing unit. Also, a flag indicating the processing unit from which the coordinates are output is set.

The area characteristic recording unit 94 specifies and calculates the required characteristic data in accordance with the flag of the area characteristic specifying unit 114, and supplies it to the corresponding processing unit. According to this embodiment, the F number is supplied to the gain calculation unit 96 in the case where the flag of the gain calculation unit 96 is set, the WB coefficient to the WB adjustment unit 102 in the case where the flag of the WB adjustment unit 102 is set, and the resolution MTF to the sharpening unit 106 in the case where the flag of the sharpening unit 106 is set.

Specifically, in the case where the coordinates input from the processing unit are associated with the focus detection area 66 and the flag indicates the gain calculation unit 96, then the area characteristic recording unit 94 calculates the F number Fa for the image acquisition area 70 and the F number Fb for the focus detection area 66 and supplies them to the gain calculation unit 96. The F number undergoes a change in accordance with the focal length and the effective aperture. The brightness of the lens is affected also by the lens transmittance. For simplification, however, the lens transmittance of the optical imaging system 12 and the microlens array 20 are assumed to be identical with each other, and not taken into consideration in the case under consideration. Also, the effective aperture and the aperture stop diameter are assumed to be coincident with each other.

Now, the calculation of the F number is explained.

The relationship between the focal length and the F number in a given focus detection area 66 is as shown in FIG. 11A. It should be noted that the solid line indicates the case in which the aperture stop diameter is 2.0 mm, the dotted line the case in which the aperture stop diameter is 4.0 mm and the dashed line the case in which the aperture stop diameter is 8.0 mm. It is bothersome to record the models corresponding to a plurality of aperture stop diameters as shown in FIG. 11A and calculate the F number by arithmetic operation each time. In view of this, according to this embodiment, the model is simplified as shown in FIG. 11B, and recorded in the parameter ROM 118.

In FIG. 11B, the model having the maximum F number is selected as a reference F number model, and approximated by a predetermined number of polygonal lines. The inflection points of each polygonal line are expressed by the coordinate data $(f_n, F_n)$ including the focal length f and the F number, where n is the number of inflection points. Also, a coefficient $k_S$ for deriving other F number models from the reference F number model is prepared. The coefficient $k_S$ is calculated by the least square method from between each F number model and the reference F number model. Other F number models are derived from the reference F number model by multiplying the coefficient $k_S$.

A method of calculating the F number from the simplified F number model shown in FIG. 11B is explained with reference to FIG. 11C. Assume a case in which F number corresponding to a given focal length $f_{th}$ and an aperture stop diameter S is determined. First, a particular section of the reference F number model with which the focal length $f_{th}$ is associated is retrieved. Assume that, in the case under consideration, the focal length $f_{th}$ is associated with the section between $(f_n, F_n)$ and $(f_{n+1}, F_{n+1})$. The reference F number $(F_{th})$ in the reference F number model is determined by linear interpolation shown in Equation 2, below.

$$F_{th}=(F_{n+1}-F_n)/(f_{n+1}-f_n)\times(f_{th}-f_n)+F_n \qquad (2)$$

Next, the coefficient $k_S$ corresponding to the aperture stop diameter S is multiplied as shown in Equation 3, below, thereby to determine the F number.

$$F=k_S \cdot F_{th} \qquad (3)$$

The parameter selection unit 116 reads the focal length $f_{th}$ and the aperture stop diameter S from the image acquisition condition specifying unit 112 in accordance with the flag indicating the gain calculation unit 96 set in the area characteristic specifying unit 114. Next, the coordinate data $(f_n, F_n)$ and $(f_{n+1}, F_{n+1})$ of the section associated with the focal length f are retrieved from the parameter ROM 118 and transferred to the interpolation unit 120. Further, the coefficient $k_S$ corresponding to the aperture stop diameter S is retrieved from the parameter ROM 118 and transferred to the correction unit 122. The interpolation unit 120 calculates the reference F number $F_{th}$ in the reference F number model according to Equation 2 from the coordinate data $(f_n, F_n)$ and $(f_{n+1}, F_{n+1})$ of the section and the focal length $f_{th}$ obtained from the parameter selection unit 116, and transfers the reference F number $F_{th}$ to the correction unit 122.

The correction unit 122 calculates the F number according to Equation 3 from the coefficient $k_S$ from the parameter selection unit 116 and the reference F number $F_{th}$ from the interpolation unit 120, and supplies it to the gain calculation unit 96 as the F number of the intended pixel P (P: each pixel of R, Gr, Gb, B).

In this case, the parameter ROM 118 has recorded therein two types of reference F number models including the reference F number model for the combined optical system of the optical imaging system 12 and the microlens array 20 and the reference F number model only for the optical imaging system 12. By processing each of the reference F number models, the F number Fa of the image acquisition area 70 and the F number Fb of the focus detection area 66 are calculated for the intended pixel P and supplied to the gain calculation unit 96.

Also, in the case where the coordinates input from the processing unit are associated with the focus detection area 66 and the flag indicates the sharpening unit 106, then the area characteristic recording unit 94 calculates the resolution MTF for the focus detection area 66 and the image acquisition area 70 and outputs it to the sharpening unit 106. The resolution MTF is varied with the focal length and the effective aperture. Although the resolution MTF is generally varied also with the image height from the optical axis of the optical imaging system 12, the value thereof at the centroid of the focus detection area 66 is regarded as a representative value in this case for simplification. The resolution MTF for the coordinates associated with the focus detection area 66, therefore, is expressed by the resolution MTF at the centroid of the focus detection area 66. Also, the effective aperture and the aperture stop diameter are assumed to be coincident with each other. The resolution MTF is calculated for each of the focus detection area 66 and the image acquisition area 70 either by actual measurement or the simulation such as the light ray tracking, and recorded beforehand in the parameter ROM 118.

Figure 12A:
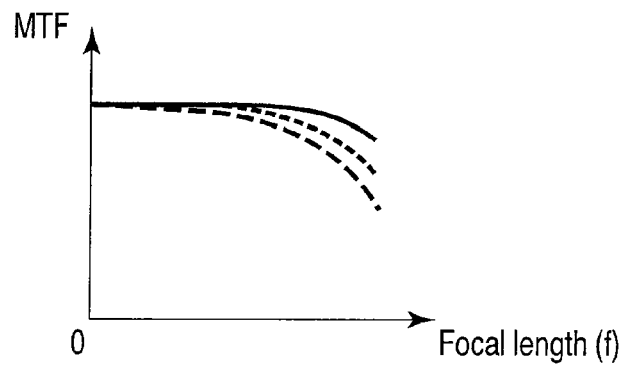
FIG. 12A is a diagram showing the relationship between the focal length and resolution MTF.

The relationship between the focal length at the coordinate of the centroid of a given focus detection area 66 and the resolution MTF is as shown in FIG. 12A. The solid line indicates the relationship for the aperture stop diameter of 8.0 mm, the dotted line the relationship for the aperture stop diameter of 4.0 mm, and the dashed line the relationship for the aperture stop diameter of 2.0 mm. It is a bothersome process to record a plurality of models corresponding to the aperture stop diameter in advance as shown in FIG. 12A and calculate the resolution MTF each time by the arithmetic operation. According to this embodiment, therefore, the model as shown in FIG. 12B is simplified and recorded in the parameter ROM 118.

Figure 12B:
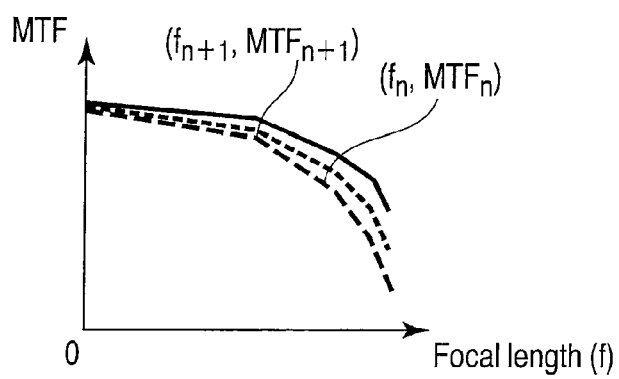
FIG. 12B is a diagram showing the simplified relationship between the focal length and the resolution MTF.

In FIG. 12B, the model for the maximum resolution MTF is selected as a reference MTF model and approximated by a predetermined number of polygonal lines. The inflection points of each polygonal line are expressed by the coordinate data $(f_n, MTF_n)$ including the focal length (f) and the resolution MTF, where n is the number of the inflection points. Also, the coefficient $k_S$ for deriving other MTF models from the reference MTF model is also prepared. The coefficient $k_S$ is calculated by the least square method from between each MTF model and the reference MTF model. Other MTF models are derived from the reference MTF model by multiplying the coefficient $k_S$.

Figure 12C:
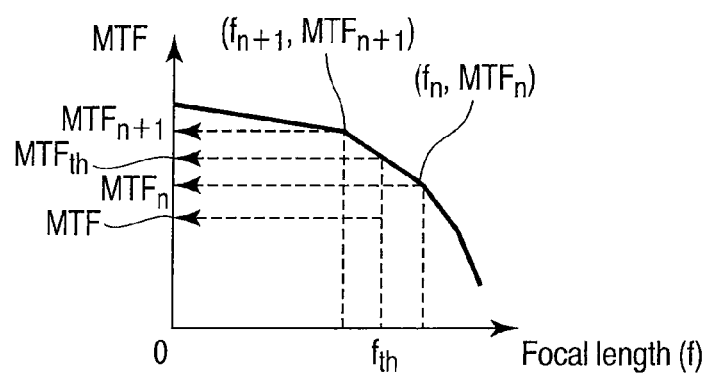
FIG. 12C is a diagram for explaining a method of calculating the resolution MTF using the relationship shown in FIG. 12B.

The method of calculating the resolution MTF from the simplified MTF model shown in FIG. 12B is explained with reference to FIG. 12C. Assume, for example, a case in which the resolution MTF corresponding to a given focal length $f_{th}$ and the aperture stop diameter S is determined. First, a particular section of the reference MTF model with which the focal point $f_{th}$ is associated is retrieved. In this case, the focal length $f_{th}$ is assumed to be associated with the section between $(f_n, MTF_n)$ and $(f_{n+1}, MTF_{n+1})$. The reference resolution $MTF_{th}$ for the reference MTF model is determined by the linear interpolation shown in Equation 4, below.

$$MTF_{th} = (MTF_{n+1} - MTF_n)/(f_{n+1} - f_n) \times (f_{th} - f_n) + MTF_n \qquad (4)$$

Next, the coefficient $k_S$ is multiplied as shown in Equation 5, below, thereby to determine the resolution MTF.

$$MTF = k_S \cdot MTF_{th} \qquad (5)$$

The parameter selection unit 116 reads the focal length $f_{th}$ and the aperture stop diameter S from the image acquisition condition specifying unit 112 in accordance with the flag indicating the sharpening unit 106 set in the area characteristic specifying unit 114. Next, the coordinate data $(f_n, MTF_n)$ and $(f_{n+1}, MTF_{n+1})$ of the section associated with the focal length $f_{th}$ is retrieved from the parameter ROM 118 and transferred to the interpolation unit 120. Further, the coefficient $k_S$ for the aperture stop diameter S is retrieved from the parameter ROM 118 and transferred to the correction unit 122. The interpolation unit 120 calculates the reference lens resolution $MTF_{th}$ in the reference MTF model based on Equation 4 from the focal length $f_{th}$ from the parameter selection unit 116 and the coordinate data $(f_n, MTF_n)$ and $(f_{n+1}, MTF_{n+1})$ of the section, and transfers the calculated reference lens resolution $MTF_{th}$ to the correction unit 122.

The correction unit 122 calculates the resolution MTF based on Equation 5 from the coefficient $k_S$ from the parameter selection unit 116 and the reference resolution $MTF_{th}$ received from the interpolation unit 120, and supplies the particular resolution MTF to the sharpening unit 106 as the resolution MTF of the intended pixel P (P: pixels of R, Gr, Gb, B).

In this case, the parameter ROM 118 has recorded therein two types of reference MTF models including the reference MTF model for the focus detection area 66 and the reference MTF model for the image acquisition area 70. By processing each of these reference MTF models for the intended pixel, the resolution MTFa for the image acquisition area 70 and the resolution MTFb for the focus detection area 66 are calculated for the intended pixel P and supplied to the sharpening unit 106.

Similarly, in the case where the flag input from the processing unit indicates the WB adjustment unit 102, the area characteristic recording unit 94 determines which of the image acquisition area 70 and the focus detection area 66 is associated with the input coordinates, and outputs the WB coefficient corresponding to the determination area to the WB adjustment unit 102. The WB coefficient is calculated, by actual measurement or the simulation such as the light ray tracking, based on the spectral sensitivity of the image sensor 22 and the spectral characteristic of the optical imaging system 12 and the microlens array 20, and recorded in the parameter ROM 118 in advance.

Next, the gain calculation unit 96 is explained.

As shown in FIG. 13, the gain calculation unit 96 includes a tone conversion gain calculation unit 124, a tone curve ROM 126 and a correction unit 128. The buffer 92 and the tone curve ROM 126 are connected to the tone conversion gain calculation unit 124. The tone conversion gain calculation unit 124 and the area characteristic recording unit 94 are connected to the correction unit 128. The correction unit 128 is connected to the noise estimation unit 98 and the tone conversion unit 108.

Basically, in the tone conversion process according to this embodiment, the pixel intensity is converted based on a fixed standard tone conversion curve based on the image signal in the image acquisition area 70. The gain for the pixel associated with the focus detection area 66 is further corrected based on the brightness and the F number of the optical system.

Thus, in the tone conversion gain calculation unit 124, the gain for each pixel of the image signal acquired from the buffer 92 is calculated based on the tone conversion curve acquired from the tone curve ROM 126 and the signal level of the pixel. The gain in the tone conversion process is defined by Equation 6, below. In Equation 6, reference character t() designates the tone conversion curve and character AVc the input signal level.

$$\text{gain} = t(AVc)/AVc \tag{6}$$

The tone conversion process is executed by calculating the gain based on the signal level of each pixel of the image signal and multiplying each pixel intensity by the calculated gain.

The surface of the focus detection area 66 is affected by the microlens array 20, and therefore, the total optical performance (F number) including the optical imaging system 12 is different between the surface of the focus detection area 66 and the surface of the image acquisition area 70. As a result, the amount of the light radiated per unit area is also different between the surfaces of the focus detection area 66 and the image acquisition area 70. Therefore, the gain of the image signal in the focus detection area 66 is corrected to secure the same signal level between the focus detection area 66 and the image acquisition area 70.

First, the coordinates of the intended pixel are transferred to the area characteristic recording unit 94, and as described above, the area associated with the intended pixel is specified by accessing the area information. In the case where the intended pixel is associated with the focus detection area 66, the F number Fa of the optical imaging system 12 and the F number Fb of a combined optical system of the optical imaging system 12 and the microlens array 20 are acquired.

The light amounts La, Lb per unit area of the image acquisition area 70 and the focus detection area 66 can be defined by Equation 7, below, where Kf is a predetermined coefficient.

$$La = Kf/(Fa)^2, \; Lb = Kf/(Fb)^2 \tag{7}$$

Thus, the light amount ratio Lab of the focus detection area 66 to the image acquisition area 70 is expressed by Equation 8, below.

$$Lab = Lb/La = (Fa/Fb)^2 \tag{8}$$

Specifically, the gain of the image signal in the focus detection area 66 is corrected in accordance with Equation 9, below, so that the image acquisition area 70 and the focus detection area 66 have a uniform signal level in the tone conversion process.

$$\text{gain}' = \text{gain} \times (Fa/Fb)^2 \tag{9}$$

It should be noted that the pixels associated with the image acquisition area 70 are not corrected.

The gain calculated as described above is transferred to the noise estimation unit 98 and the tone conversion unit 108.

Next, the noise estimation unit 98 is explained.

As shown in FIG. 14, the noise estimation unit 98 includes an average calculation unit 130, a parameter selection unit 132, a parameter ROM 134, an interpolation unit 136 and a correction unit 138.

The buffer 92 is connected to the average calculation unit 130, and the average calculation unit 130 and the parameter ROM 134 are connected to the parameter selection unit 132. The parameter selection unit 132 is connected to the interpolation unit 136, and the interpolation unit 136 and the gain calculation unit 96 are connected to the correction unit 138. The correction unit 138 is connected to the noise reduction unit 100.

The noise estimation unit 98 estimates the noise from a noise model obtained with respect to the signal level of the image sensor 22. Also, the noise corresponding to the gain is corrected taking the noise amplification in the tone conversion process based on the gain multiplication in the last stage into consideration.

The average calculation unit 130 extracts the local area $P_{ij}$ (i=0 to 2; j=0 to 2; P: pixels of R, Gr, Gb, B) shown in FIG. 8, and by calculating the average $AV_{11}$ of the local area $P_{ij}$ as indicated by Equation 10, below, transfers it to the parameter selection unit 132.

$$AV_{11} = \Sigma P_{ij}/9 \tag{10}$$

With regard to the color signals in separate state, the local area is formed for each color signal, and then transferred to the average calculation unit 130. The noise estimation and the noise reduction process are subsequently executed for each color signal. The average calculation unit 130 calculates the average for the local area and transfers it to the parameter selection unit 132.

Figure 15A:
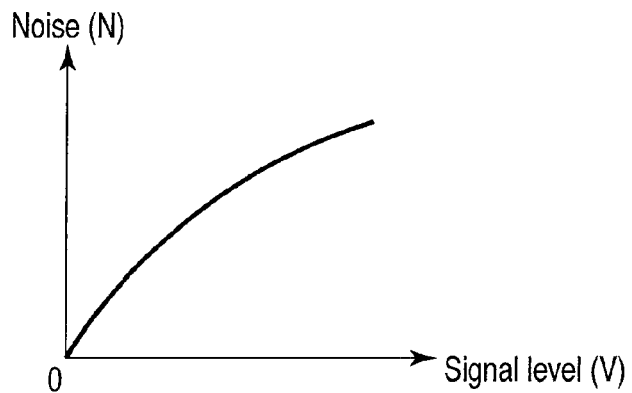
FIG. 15A is a diagram showing the relationship between a signal level and a maximum noise in an intermediate brightness area.

The relationship between the signal level and the maximum noise for the gain of 1.0 in the intermediate brightness area is as shown in FIG. 15A. Let the signal level be V. The result of modeling the noise N by the secondary function is obtained as shown in Equation 11, where $\alpha$, $\beta$, $\gamma$ are constant terms.

$$N = \alpha V^2 + \beta V + \gamma \tag{11}$$

The tendency of the noise distribution is varied with the combination of the processing units. The noise distribution, though modeled according to a secondary polynomial in the case under consideration, can alternatively be modeled by the primary function as shown in Equation 12, below, or the log function as shown in Equation 13, below. Equations 12 and 13 which can be easily replaced with Equation 11 are not explained any further.

$$N = \alpha V + \beta \tag{12}$$

$$N = \alpha \log V \tag{13}$$

Figure 15B:
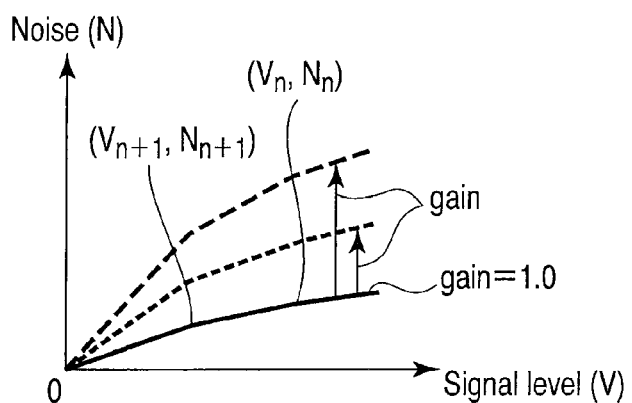
FIG. 15B is a diagram showing the simplified relationship between the signal level and the maximum noise.

In this case, in order to reduce the load of the arithmetic operation for noise calculation, the model is simplified as shown in FIG. 15B.

In FIG. 15B, the reference noise model for the gain of 1.0 (hereinafter referred to as the reference noise model) is approximated by a predetermined number of polygonal lines. The inflection points of each polygonal line are expressed by the coordinate data $(V_n, N_n)$ including the signal level V and the noise N, where n is the number of inflection points.

Figure 15C:
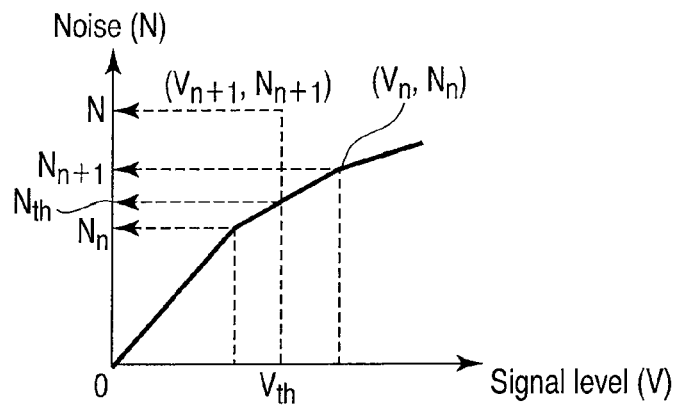
FIG. 15C is a diagram for explaining a method of calculating the noise using the relationship shown in FIG. 15B.

A method of calculating the noise from the simplified noise model as shown in FIG. 15B is explained with reference to FIG. 15C. Assume, for example, that the noise N corresponding to a given signal level $V_{th}$ and the gain of $K_g$ is determined. First, which section of the reference noise model is associated with the signal level $V_{th}$ is determined by search. In this case, the signal level $V_{th}$ is assumed to be associated with the section between $(V_n, N_n)$ and $(V_{n+1}, N_{n+1})$. The reference noise $N_{th}$ in the reference noise model is determined by the linear interpolation indicated by Equation 14, below.

$$N_{th}=(N_{n+1},N_n)/(V_{n+1}-V_n)\times(V_{th}-V_n)+N_n \qquad (14)$$

Next, the gain $K_s$ and the predetermined coefficient $K_c$ are multiplied by the reference noise $N_{th}$ as shown in Equation 15, below, thereby to determine the noise N.

$$N=K_g \cdot K_c \cdot N_{th} \qquad (15)$$

Specific processing steps are explained below.

The parameter selection unit 132 sets the signal level $V_{th}$ from the average $AV_{11}$ for the local area obtained by the average calculation unit 130. Next, the coordinate data $(V_n, N_n)$ and $(V_{n+1}, N_{n+1})$ of the section associated with the signal level $V_{th}$ are retrieved from the parameter ROM 134 and transferred to the interpolation unit 136.

The interpolation unit 136 calculates the reference noise $N_{th}$ in the reference noise model based on Equation 14 from the signal level $V_{th}$ from the parameter selection unit 132 and the coordinate data $(V_n, N_n)$ and $(V_{n+1}, N_{n+1})$ of the section, and transfers the reference noise $N_{th}$ to the correction unit 138.

The correction unit 138, based on the gain $K_g$ from the gain calculation unit 96, a predetermined weighting coefficient $K_c$ and the reference noise $N_{th}$ from the interpolation unit 136, calculates the noise N according to Equation 15, and sets it as the noise $N_{11}$ of the intended pixel $P_{11}$.

The noise $N_{11}$ and the average $AV_{11}$ estimated in this way are transferred to the noise reduction unit 100.

Next, the noise reduction unit 100 is explained.

As shown in FIG. 16, the noise reduction unit 100 includes a switching unit 140, a range setting unit 142, a first smoothing unit 144 and a second smoothing unit 146.

The buffer 92 is connected to the switching unit 140. The noise estimation unit 98 is connected to the range setting unit 142, while the switching unit 140 and the range setting unit 142 are connected to the first smoothing unit 144 and the second smoothing unit 146. The first smoothing unit 144 and the second smoothing unit 146 are connected to the focus detection calculation unit 46 and the WB adjustment unit 102.

The noise estimation unit 98, as described above, transfers the average $AV_{11}$ of the local area $P_{ij}$ and the noise $N_{11}$ of the intended pixel $P_{11}$ to the range setting unit 142.

The range setting unit 142 sets the upper limit "Up" and the lower limit "Low" as a tolerable range of the noise as shown in Equations (16) and (17) below.

$$\mathrm{Up}=AV_{11}+(N_{11}/2) \qquad (16)$$

$$\mathrm{Low}=AV_{11}-(N_{11}/2) \qquad (17)$$

The upper limit "Up" and the lower limit "Low" of the tolerable range are transferred to the switching unit 140. Also, the range setting unit 142 transfers the average $AV_{11}$ and the noise $N_{11}$ to the first smoothing unit 144 and the second smoothing unit 146.

The switching unit 140 reads the intended pixel $P_{11}$ from the buffer 92 and determines whether it belongs or not to the tolerable range described above. The determination is any one of the three, i.e., "within noise range", "above noise range" and "below noise range". In the case where the determination is "within noise range", the switching unit 140 transfers the intended pixel $P_{11}$ to the first smoothing unit 144, or otherwise, to the second smoothing unit 146.

The first smoothing unit 144 executes the process of substituting the average $AV_{11}$ from the range setting unit 142 into the intended pixel $P_{11}$ from the switching unit 140 as shown in Equation 18, below.

$$P'_{11}=AV_{11} \qquad (18)$$

The second smoothing unit 146 executes the process of correcting the intended pixel $P_{11}$ from the switching unit 140 using the average $AV_{11}$ and the noise $N_{11}$ from the range setting unit 142. First, in the case where the determination is "above noise range", the correction process is executed as shown by Equation 19, below.

$$P'_{11}=AV_{11}-N_{11}/2 \qquad (19)$$

In the case where the determination is "below noise range", on the other hand, the correction process is executed as shown by Equation 20, below.

$$P'_{11}=AV_{11}+N_{11}/2 \qquad (20)$$

The intended pixel $P'_{11}$ and the noise $N_{11}$ subjected to the noise reduction process as shown in Equation 18, 19 or 20 are transferred to the focus detection calculation unit 46 and the WB adjustment unit 102.

Next, the sharpening unit 106 is explained.

As shown in FIG. 17, the sharpening unit 106 includes a Y/C separation unit 148, a filter ROM 150, a filter processing unit 152, an edge correction unit 154, an edge emphasizing unit 156 and a Y/C combining unit 158.

The color interpolation unit 104 is connected to the Y/C separation unit 148. The Y/C separation unit 148 is connected to the filter processing unit 152 and the edge emphasizing unit 156. The filter ROM 150 is connected to the filter processing unit 152. The area characteristic recording unit 94 and the filter processing unit 152 are connected to the edge correction unit 154. The edge correction unit 154 is connected to the edge emphasizing unit 156. The edge emphasizing unit 156 is connected to the Y/C combining unit 158. The Y/C combining unit 158 is connected to the tone conversion unit 108.

The Y/C separation unit 148 reads the image signal, pixel by pixel, from the color interpolation unit 104, and separates it into the brightness signal Y and the color difference signal C in accordance with Equation 21, below. The brightness signal Y is transferred to the filter processing unit 152, while the brightness signal Y and the color difference signal C are transferred to the edge emphasizing unit 156.

$$Y=0.29900R+0.58700G+0.11400B$$

$$Cb=-0.16874R-0.33126G+0.50000B$$

$$Cr=0.50000R-0.41869G-0.08131B \qquad (21)$$

As the first step in the filter processing unit 152, the filter coefficient required for the well-known filter process to extract the edge component is read from the filter ROM 150. In the case where the filter size is (5×5) pixels, for example, the local area of (5×5) pixels as a unit is read from the image signal received from the Y/C separation unit 148. Then, the edge signal Eg is determined using the filter coefficient and transferred to the edge correction unit 154.

The subjective impression of resolution is different between the focus detection area 66 and the image acquisition area 70 because of the effect of the microlens array 20. In order to maintain the balance, therefore, the edge correction unit 154 corrects the edge signal Eg based on the MTF of each area for the pixels associated with the focus detection area 66.

First, as described above, the coordinates of the intended pixel are transferred to the area characteristic recording unit 94, and the area associated with the intended pixel is specified by referring to the area information. In the case where the intended pixel is associated with the focus detection area 66, the resolutions MTF (MTFa, MTFb) corresponding to the image acquisition area 70 and the focus detection area 66, respectively, are acquired. According to this embodiment, as indicated by Equation 22, below, the correction is made based on the inverse of the MTF ratio of each area. In Equation 22, character Eg' indicates the edge signal after correction and Ke a predetermined coefficient.

$$Eg'=Eg \times Ke/(MTFb/MTFa) \quad (22)$$

The edge emphasizing unit 156 extracts the local area of a predetermined size from the brightness signal Y converted according to Equation 21 in the Y/C separation unit 148, and executes the sharpening process by adding the edge signal Eg or Eg' from the filter processing unit 152 to the brightness signal Y.

The brightness signal Y after sharpening and the color difference signal C are transferred to the Y/C combining unit 158. In the Y/C combining unit 158, the brightness signal Y and the color difference signal C are converted to the RGB image signals according to Equation 23, below. The image signals thus converted are transferred to the tone conversion unit 108.

$$R=Y+1.40200Cr$$

$$G=Y-0.34414Cb-0.71414Cr$$

$$B=Y+1.77200Cb \quad (23)$$

It should be noted that, according to this embodiment, the pixels associated with the diffraction area 68 are interpolated by the image signal associated with the focus detection area 66 and the image acquisition area 70 in the neighborhood of the pixels in the diffraction area 68. As an alternative, after the pixels in the analysis area are subjected to the similar process to the pixels in the image acquisition area 70, the correction process may be made by taking an average based on the pixels in the focus detection area 66 and the image acquisition area 70 located in the neighborhood.

Also, the area characteristic recording unit 94 shown in FIG. 10 has recorded therein the coordinate information indicating the focus detection area 66, the image acquisition area 70 and the diffraction area 68, and the area associated with the coordinate can be specified based on the coordinates. As an alternative configuration, however, the coordinate information only on the diffraction area 68 is recorded, and a determination unit specifies the focus detection area 66 for the coordinates associated with the diffraction area 68, and the image acquisition area 70 for the coordinates associated with the outside of the diffraction area. Conversely, a configuration may be employed in which only the focus detection area 66 and the image acquisition area 70 are recorded, so that a determination unit specifies the diffraction area 68 for the coordinates not associated with any of the areas. As still another alternative, the diffraction area 68 is merged with the focus detection area 66 or the image acquisition area 70, and the process on the diffraction area 68 (the diffraction area correction unit, etc.) is deleted.

Further, although this embodiment presupposes the process with hardware, the invention is not necessarily limited to such a configuration.

For example, a configuration is possible in which the signal processing unit 54 outputs the signal from the image sensor 22 as unprocessed RAW data by adding the lens characteristic and the image acquisition information as header information, and this information is processed separately as software by the CPU 32 of the system controller 30. In this case, the optical characteristic data related to the optical imaging system 12 and the microlens array 20 and the various parameters described above are stored beforehand in the EEPROM 40 of the system controller 30.

Figure 18:
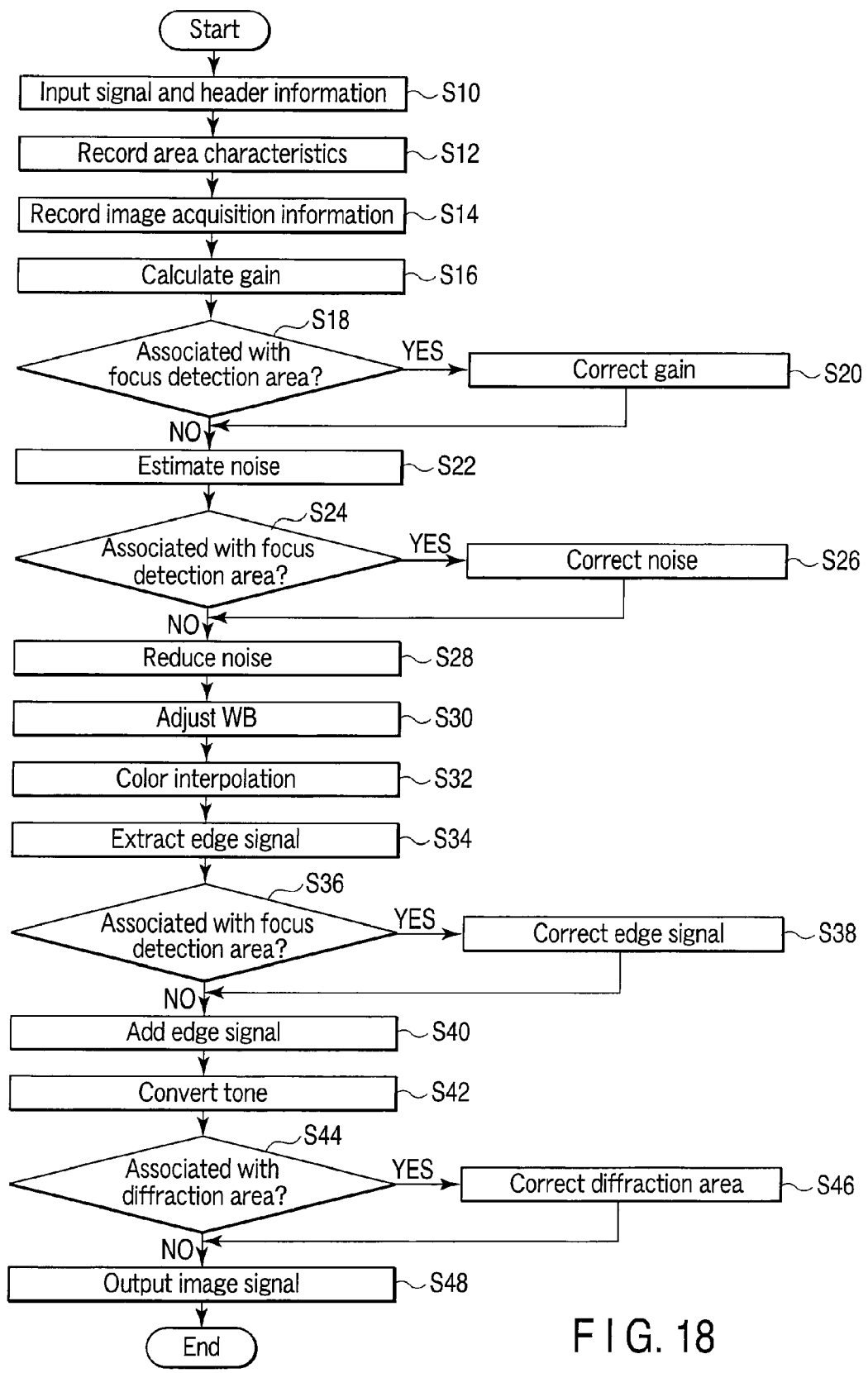
FIG. 18 is a flowchart for the signal processing by software.

Specifically, as shown in FIG. 18, the CPU 32 first reads the image signal and the header information output from the signal processing unit 54 (step S10). Also, the optical characteristic data related to the optical imaging system 12 and the microlens array 20 are read from the EEPROM 40 and recorded in the RAM 36 (step S12). Also, the image acquisition information such as the focal length and the aperture stop diameter of the optical imaging system 12 for the image acquisition operation is extracted from the header information and recorded in the RAM 36 (step S14).

Next, the gain in the tone conversion process is calculated (step S16). Then, for each pixel, it is determined whether the pixel is associated with the focus detection area 66 or not (step S18). The pixel associated with the focus detection area 66 is subjected to the gain correction process based on the F number of the focus detection area 66 and the image acquisition area 70 (step S20).

Once the gain is determined for all the pixels, the next step is to estimate the noise of each pixel (step S22). Then, for each pixel, it is determined whether the pixel is associated with the focus detection area 66 or not (step S24). The pixel associated with the focus detection area 66 is subjected to the noise correction process based on the gain (step S26). Once the noise is determined for all the pixels in this way, the noise reduction process is executed based on the particular noise level (step S28).

After that, the WB adjustment process is executed based on the WB coefficient corresponding to each area (step S30). Then, from the single RAW image, the RGB images are generated using the well-known color interpolation process (step S32).

Next, after converting the RGB images into the Y/C signals, the edge signal is extracted from the Y signal (step S34). Then, for each pixel, it is determined whether the pixel is associated with the focus detection area 66 or not (step S36). The pixel associated with the focus detection area 66 is subjected to the edge signal correction process based on the MTF ratio of each area (step S38).

Once the edge signal is obtained for all the pixels in this way, the particular edge signal is added to the original Y signal, and then converted into the RGB signals by the Y/C combining process (step S40). The tone conversion process is executed based on the gain calculated in steps S16 to S20 (step S42).

After that, for each pixel, it is determined whether the pixel is associated with the diffraction area 68 or not (step S44). With regard to the pixels associated with the diffraction area 68, the pixel intensities in the diffraction area 68 are corrected based on the pixel intensities in the focus detection area 66 and the image acquisition area 70 located in the neighborhood of the pixels in the diffraction area 68 (step S46). The image signal thus obtained is output (step S48).

It should be noted that the flowchart of FIG. 18 shows the process of the main image acquisition operation performed by turning on the 2RSW 50 upon the second-stage depression of the release button.

In the pre-image acquisition mode for detecting the focal point and performing the AF operation by turning on the 1RSW 48 upon the first-stage depression of the release button, the process of steps S10 to S14 and S22 to S28 is executed, and the image signal after noise reduction is transmitted to the focus detection calculation unit 46. As a result, the focus detection calculation unit 46 calculates the phase difference and detects the focal point based on the image signal associated with the focus detection area 66.

As described above, according to the first embodiment, the focal point is detected and the focus is controlled based on the image signal associated with the area in which the microlens array 20 is arranged. By doing so, the highly accurate detection of the focal point and the focus control are made possible without adding any new mechanism or optical system while at the same time reducing the cost with a small space.

Also, with regard to the image signal produced by the image sensor 22, the image signal associated with the area affected by the microlens array 20 is specified. In the case where the various signal processing such as the noise reduction, the WB adjustment, sharpening and the tone conversion are carried out for the image signal in the particular area, the correction is made based on the optical characteristic of the microlens array 20 and the characteristics of the image sensor. As a result, a high image quality is achieved.

[Second Embodiment]

Next, a second embodiment equivalent to a modification of the first embodiment is explained.

In the second embodiment, the same component parts as those of the first embodiment are designated by the same names and the same reference numbers, respectively, and only different parts are explained below.

The configuration of the optical system and the signal processing system of the image acquisition apparatus according this second embodiment are different from those of the first embodiment shown in FIGS. 1 and 15B only in the signal processing unit. Specifically, according to the second embodiment, the signal processing unit 54 in the first embodiment is replaced by a signal processing unit 160 shown in FIG. 19. The method of detecting the focal point and the method of driving the lens are similar to those of the first embodiment.

Figure 19:
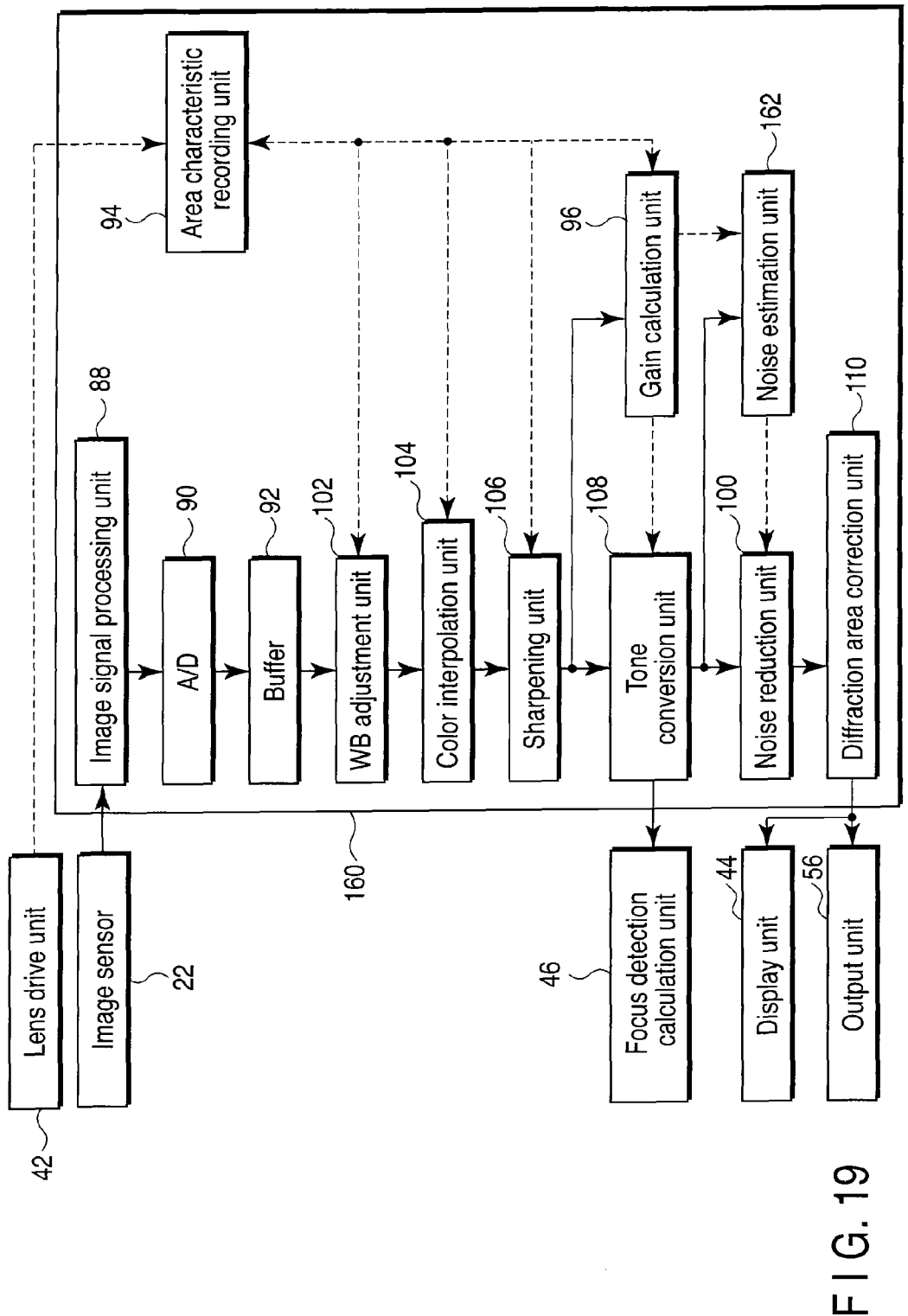
FIG. 19 is a block diagram showing the configuration of a signal processing unit of an image acquisition apparatus according to a second embodiment of the invention.

As shown in FIG. 19, the lens drive unit 42 is connected to the area characteristic recording unit 94 of the signal processing unit 160 according to this embodiment. The image sensor 22 is connected to the image signal processing unit 88. The image signal processing unit 88 is connected to the buffer 92 through the A/D converter 90. The area characteristic recording unit 94 is connected bidirectionally with the gain calculation unit 96, the WB adjustment unit 102, the color interpolation unit 104 and the sharpening unit 106. The buffer 92 is connected to the WB adjustment unit 102. The WB adjustment unit 102 is connected to the color interpolation unit 104. The color interpolation unit 104 is connected to the sharpening unit 106. The sharpening unit 106 is connected to the tone conversion unit 108 and the gain calculation unit 96. The gain calculation unit 96 is connected to a noise estimation unit 162 and the tone conversion unit 108. The tone conversion unit 108 is connected to the focus detection calculation unit 46, the noise estimation unit 162 and the noise reduction unit 100. The noise estimation unit 162 is connected to the noise reduction unit 100. The noise reduction unit 100 is connected to the diffraction area correction unit 110. The diffraction area correction unit 110 is connected to the display unit 44 and the output unit 56.

With reference to FIG. 19, the signal flow is explained.

First, the 1RSW 48 is turned on by the first-stage depression of the release button, thereby entering the pre-image acquisition mode to detect the focal point and perform the AF operation. In the pre-image acquisition mode, the signal processing unit 160 generates an image signal for the purpose of the arithmetic operation to detect the focal point, and transfers the image signal to the focus detection calculation unit 46.

Specifically, first, the signal of the image produced by the image sensor 22 is transmitted to the image signal processing unit 88, and after CDS/differential sampling and the analog gain adjustment, converted into a digital signal by the A/D converter 90, and transferred to the buffer 92. The image signal in the buffer 92 is subjected to such operations as the WB adjustment, the color interpolation and the sharpening by the WB adjustment unit 102, the color interpolation unit 104 and the sharpening unit 106, respectively, by the method similar to the one employed in the first embodiment. The image signal after the sharpening process is transferred to the tone conversion unit 108 and the gain calculation unit 96.

In the gain calculation unit 96, the gain is determined based on the standard tone conversion curve in the tone conversion gain calculation unit 124, and transferred to the tone conversion unit 108 through the correction unit 128. The tone conversion unit 108 executes the tone conversion process on the image signal based on the gain thus determined, and the image signal after the tone conversion process is transmitted to the focus detection calculation unit 46. The focus detection calculation unit 46 calculates the phase difference based on the image signal associated with the focus detection area 66 thereby to detect the focal point. It should be noted that, according to this embodiment, the brightness signal is generated from the RGB images and the focal point is detected based on the brightness signal.

Then, the main image acquisition operation is started by turning on the 2RSW 50 with the second-stage depression of the release button. As in the pre-image acquisition mode, the image signal produced by the image sensor 22 is converted to a digital signal through the image signal processing unit 88 and the A/D converter 90 and transferred to the buffer 92. The image signal in the buffer 92, by the same method as in the first embodiment, is subjected to the WB adjustment, the color interpolation and the sharpening through the WB adjustment unit 102, the color interpolation unit 104 and the sharpening unit 106, respectively. The image signal after the sharpening process is transferred to the tone conversion unit 108 and the gain calculation unit 96.

In the gain calculation unit 96, the amplification factor of the signal level for each pixel in the last-stage tone conversion process is calculated in advance as a gain. The F numbers of the optical system working on the focus detection area 66 and the image acquisition area 70 are different because of the effect of the microlens array 20, and different gains are generated for the same signal level. With regard to the pixels associated with the focus detection area 66, therefore, the F number for the focus detection area 66 and the image acquisition area 70 is acquired from the area characteristic recording unit 94, and the gain is calculated based on the F number together with the signal level. With regard to the pixels associated with the image acquisition area 70, on the other hand, the gain is calculated based on the signal level. The gain thus calculated is transferred to the noise estimation unit 162 and the tone conversion unit 108. In the tone conversion unit 108, the tone conversion process is executed based on the gain, and the image signal after tone conversion is transferred to the noise reduction unit 100 and the noise estimation unit 162.

In the noise estimation unit 162, the intended area $P_{ij}$ (i=0 to 2P; j=0 to 2) of the (3×3) pixel size containing the intended pixel $P_{11}$ (P: pixels of R, Gr, Gb, B) are sequentially extracted. After that, the noise N for the intended pixels $P_{11}$ is estimated from the noise model based on the image sensor characteristic corresponding to the signal level. The noise model in the second embodiment assumes a different form than the distribution trend of the noise corresponding to the signal level in the first embodiment because of the effect of the gain multiplication in the tone conversion unit 108. The noise model and the noise estimation unit 98 are described in detail later. The noise thus estimated is transferred to the noise reduction unit 100.

The noise reduction unit 100 executes the smoothing process by coring based on the noise N estimated by the noise estimation unit 98. The image signal after noise reduction is transferred to the diffraction area correction unit 110. In the diffraction area correction unit 110, the signal level of the pixels associated with the diffraction area 68 is corrected by the same method as in the first embodiment, and the image signal after correction is transferred to the output unit 56 and the display unit 44. The output unit 56 is configured of a compression/decompression circuit and a recording medium, and the image signal from the tone conversion unit 108, after being compressed by the compression/decompression circuit, is recorded in the recording medium as an image signal (still image data).

Next, the noise estimation unit 162 according to this second embodiment is explained.

As shown in FIG. 20, the noise estimation unit 162 is equivalent to the noise estimation unit 98 of the first embodiment with the parameter ROM 134 replaced by a parameter ROM 164.

The tone conversion unit 108 is connected to the average calculation unit 130. The average calculation unit 130 and the parameter ROM 164 are connected to the parameter selection unit 132. The noise estimation unit 162 estimates the noise from a model of the noise for the signal level based on the characteristic of the image sensor 22.

In this case, the local area is formed for each color signal and transferred from the tone conversion unit 108 to the average calculation unit 130.

Subsequently, the noise estimation process and the noise reduction process are executed for each color signal. The average calculation unit 130 extracts the local area $P_{ij}$ shown in FIG. 8, and by calculating the average $AV_{11}$ of the local area $P_{ij}$ in accordance with Equation 10, transfers it to the parameter selection unit 132.

FIGS. 21A to 21C are diagrams for explaining the noise estimation according to the second embodiment. Because of the effect of the gain multiplication based on the tone conversion curve, this embodiment is different from the noise model for the noise calculation according to the first embodiment shown in FIGS. 15A to 15C in the distribution trend of the noise with respect to the signal level.

With the signal level in the intermediate brightness area, the relationship between the signal level at the gain of 1.0 and the maximum noise is as shown in FIG. 21A. Let the signal level be V. In the case where the noise N is modeled with the quaternary function, Equation 24, below, is obtained, where $\alpha$, $\beta$, $\gamma$, $\delta$, $\epsilon$ are constant terms.

$$N = \alpha \times V^4 + \beta \times V^3 + \gamma \times V^2 + \delta \times V + \epsilon \quad (24)$$

where in order to reduce the load of the arithmetic process for calculating the noise, the model is simplified as shown in FIG. 21B.

In FIG. 21B, a reference noise model with gain of 1.0 is approximated with a predetermined number of polygonal lines. The inflection points of each polygonal line are expressed by the coordinate data $(V_n, N_n)$ including the signal level V and the noise N, where n is the number of inflection points.

A method of calculating the noise from the simplified noise model shown in FIG. 21B is explained with reference to FIG. 21C. Assume that the noise N corresponding to a given signal level $V_{th}$ and the gain of $K_g$ is determined. First, which section of the reference noise model is associated with the signal level $V_{th}$ is searched for. In the case under consideration, assume that the signal level $V_{th}$ is associated with the section between $(V_n, N_n)$ and $(V_{n+1}, N_{n+1})$. Then, the reference noise $N_{th}$ for the reference noise model is determined by the linear interpolation shown in Equation 14.

Next, the gain of $K_g$ is multiplied by the reference noise $N_{th}$ together with a predetermined coefficient $K_c$ as shown in Equation 15 thereby to determine the noise N.

Specific steps of the process are described below.

Specifically, the parameter selection unit 132 sets the signal level $V_{th}$ from the average $AV_{11}$ of the local area from the average calculation unit 130. Next, the coordinate data $(V_n, N_n)$ and $(V_{n+1}, N_{n+1})$ of the section associated with the signal level $V_{th}$ is retrieved from the parameter ROM 164, and transferred to the interpolation unit 136.

The interpolation unit 136, based on the signal level $V_{th}$ and the coordinate data $(V_n, N_n)$ and $(V_{n+1}, N_{n+1})$ of the section from the parameter selection unit 132, calculates the reference noise $N_{th}$ in the reference noise model based on Equation 14 and transfers it to the correction unit 138.

The correction unit 138 determines the gain of $K_g$ and a predetermined weighting coefficient $K_c$ from the gain calculation unit 96 on the one hand, and calculates the noise from Equation 15 based on the reference noise $N_{th}$ from the interpolation unit 136 on the other hand, thereby determining the noise $N_{11}$ of the intended pixel $P_{11}$.

The noise $N_{11}$ and the average $AV_{11}$ estimated in this way are transferred to the noise reduction unit 100.

As described above, according to the second embodiment, a similar effect to the first embodiment is obtained. Further, in view of the fact that the image signal after the tone conversion process based on the area information is subjected to the noise reduction process, the effect of the noise reduction process on the tone conversion process is suppressed, and a highly accurate tone conversion process is made possible taking the brightness (F number) for each area into consideration.

It should be noted that the second embodiment is explained by taking the hardware process as granted. Nevertheless, the invention is not necessarily limited to this configuration.

As an alternative configuration, for example, the signal processing unit 160 outputs the signal from the image sensor 22 as the unprocessed RAW data, with the lens characteristics and the image acquisition information added as header information, and the particular signal is processed by software separately by the CPU 32 of the system controller 30. In this case, the EEPROM 40 of the system controller 30 has recorded beforehand therein the optical characteristic data for the optical imaging system 12 and the microlens array 20 and the various parameters described above.

Figure 22:
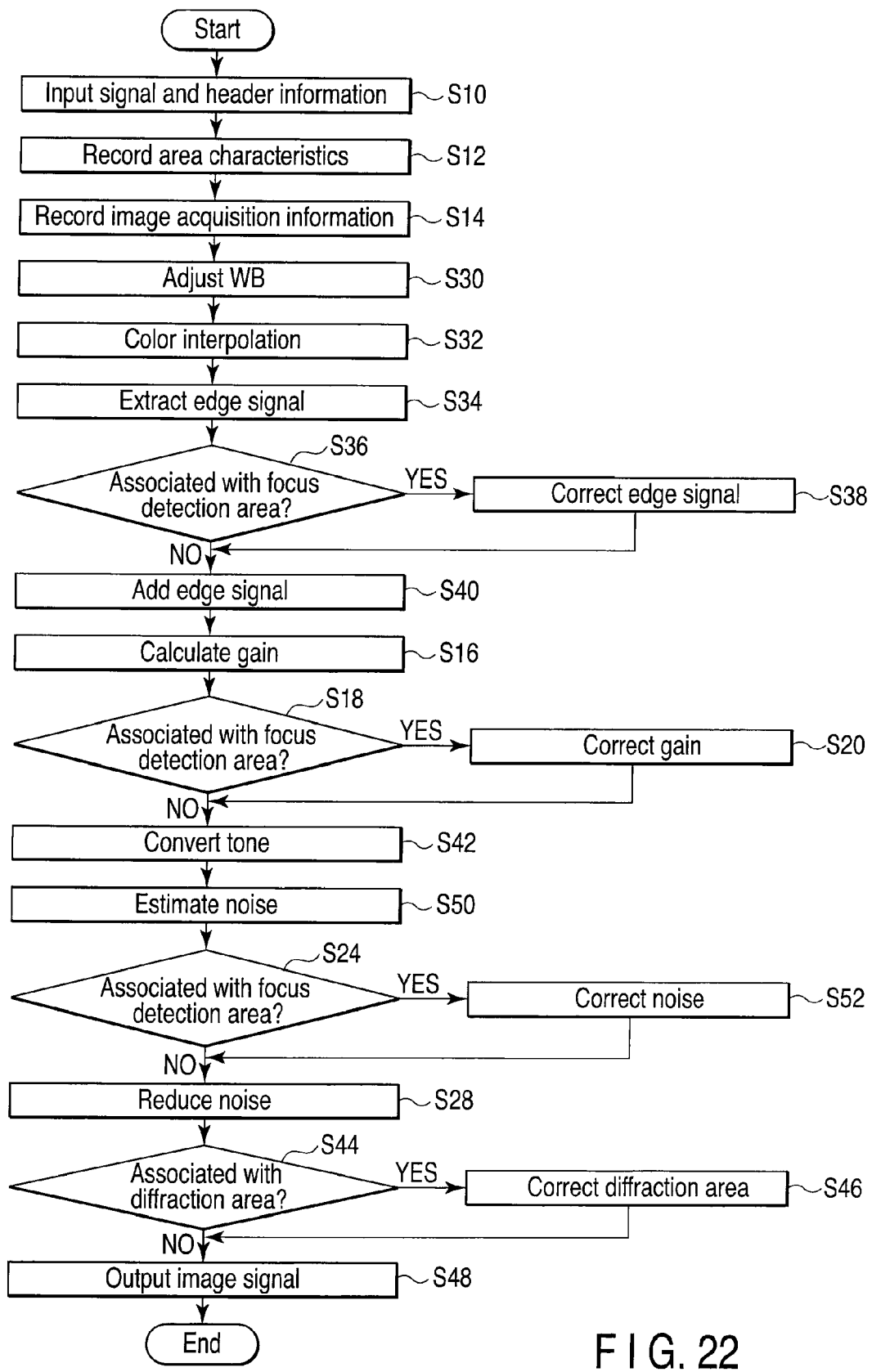
FIG. 22 is a flowchart for the signal processing by software according to the second embodiment.

FIG. 22 is a flowchart for processing the signal by software. It should be noted that the same steps as those in the signal processing flowchart of the first embodiment are designated by the same reference numbers, respectively.

First, the CPU 32 reads the image signal and the header information output from the signal processing unit 160 (step S10). Also, the optical characteristic data related to the optical imaging system 12 and the microlens array 20 are read from the EEPROM 40 and recorded in the RAM 36 (step S12). Further, the image acquisition information such as the focal length and the aperture stop diameter of the optical imaging system 12 for the image acquisition operation are extracted from the header information and recorded in the RAM 36 (step S14).

After that, the WB adjustment process is executed based on the WB coefficient corresponding to each area (step S30). From this single RAW image, the RGB images are generated using the well-known color interpolation process (step S32).

Next, after converting the RGB images into the Y/C signals, the edge signal is extracted from the Y signal (step S34). For each pixel, it is determined whether the pixel is associated with the focus detection area 66 or not (step S36). With regard to the pixels associated with the focus detection area 66, the edge signal is corrected based on the MTF ratio of each area (step S38).

Once the edge signal is obtained for all the pixels in this way, the next step is to add the edge signal to the original Y signal and convert it to the RGB signals by the Y/C combining process (step S40). Next, the gain in the tone conversion process is calculated (step S16). After that, for each pixel, it is determined whether the pixel is associated with the focus detection area 66 or not (step S18). With regard to the pixels associated with the focus detection area 66, the gain is corrected based on the F number of the focus detection area 66 and the image acquisition area 70 (step S20). Then, the tone conversion process is executed based on these gains (step S42).

Next, the noise of each pixel is estimated (step S50). Then, for each pixel, it is determined whether the pixel is associated with the focus detection area 66 or not (step S24). With regard to the pixels associated with the focus detection area 66, the noise is corrected based on the gain (step S52). Once the noise is determined for all the pixels in this way, the noise reduction process is executed based on the noise (step S28).

After that, for each pixel, it is determined whether the pixel is associated with the diffraction area 68 or not (step S44). With regard to the pixels associated with the diffraction area 68, the process of correcting the pixel intensity in the diffraction area 68 is executed based on the pixel intensity in the focus detection area 66 and the image acquisition area 70 in the neighborhood of the particular pixel in the diffraction area 68 (step S46). Then, the image signal thus obtained is output (step S48).

It should be noted that the flowchart of FIG. 22 indicates the process of the main image acquisition operation performed by turning on the 2RSW 50 with the second-stage depression of the release button.

In the pre-image acquisition mode for detecting the focal point and performing the AF operation by turning on the 1RSW 48 by the first-stage depression of the release button, the process of steps S10 to S42 is executed, and the image signal after the tone conversion is transmitted to the focus detection calculation unit 46. As a result, the phase difference is calculated based on the image signal associated with the focus detection area 66 in the focus detection calculation unit 46 thereby to detect the focal point.

It should be noted that each method of signal processing by software described in this embodiment can be stored in the program recording medium and distributed as a program capable of being executed by the computer. The computer reads the program stored in the program recording medium, and according to the program thus read, the operation is controlled. As a result, a similar signal processing by software to that explained in the embodiment above can be executed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image acquisition apparatus comprising:
   an optical imaging system;
   an image sensor configured to acquire an image of an object through the optical imaging system and to produce an image signal;
   a plurality of pupil-division lenses configured to pupil-divide a light flux of object image light passed through the optical imaging system in an area on a surface of the image sensor;
   a coordinate recording unit configured to record coordinate information to specify the area on the surface of the image sensor;
   a correction unit configured to execute, based on an optical characteristic of the plurality of pupil-division lenses corresponding to the area and characteristics of the image sensor, a correction process to correct the image signal obtained by an image acquisition operation of the image sensor, according to the coordinate information recorded in the coordinate recording unit; and
   a focus detection unit configured to detect a focal point based on a selected one of the image signal before the correction process and the image signal after the correction process executed by the correction unit.

2. The image acquisition apparatus according to claim 1, wherein the correction unit executes the correction process to correct the image signal from the image sensor affected by the light flux passed through the plurality of pupil-division lenses, based on the coordinate information recorded in the coordinate recording unit.

3. The image acquisition apparatus according to claim 1, wherein the correction unit executes the correction process to correct the image signal from the image sensor to focus only the light flux passed through the plurality of pupil-division lenses, based on the coordinate information recorded in the coordinate recording unit.

4. The image acquisition apparatus according to claim 1, wherein the correction unit executes, based on the coordinate information recorded in the coordinate recording unit, the correction process differently between the area of the image sensor, in which only the light flux passed through the plurality of pupil-division lenses is focused and an area of the image sensor affected by a light flux other than the light flux passed through the plurality of pupil-division lenses.

5. The image acquisition apparatus according to claim 1, wherein the coordinate recording unit records, as the coordinate information, at least one of:
   information on a coordinate in the area of the image sensor, in which only the light flux passed through the plurality of pupil-division lenses is focused;
   information on a coordinate located outside of the area and not affected by the light flux passed through the plurality of pupil-division lenses; and
   information on a coordinate located on a boundary of the area and affected by the light flux passed through the plurality of pupil-division lenses.

6. The image acquisition apparatus according to claim 1, wherein the correction unit further includes:

a noise reduction unit configured to reduce noise of the image signal from the image sensor based on the coordinate information recorded in the coordinate recording unit; and a tone conversion unit configured to convert a tone of the image signal after noise reduction by the noise reduction unit, based on the coordinate information recorded in the coordinate recording unit.

7. The image acquisition apparatus according to claim 1, wherein the correction unit includes:

a tone conversion unit configured to convert a tone of the image signal from the image sensor based on the coordinate information recorded in the coordinate recording unit; and a noise reduction unit configured to reduce noise of the image signal after tone conversion by the tone conversion unit, based on the coordinate information recorded in the coordinate recording unit.

8. The image acquisition apparatus according to claim 7, wherein the tone conversion unit sets a tone conversion coefficient based on a brightness of the optical imaging system and the coordinate information recorded in the coordinate recording unit and executes the tone conversion based on the tone conversion coefficient.

9. The image acquisition apparatus according to claim 7, wherein the noise reduction unit includes:

a noise estimation unit configured to estimate the noise of the image signal; and a smoothing unit configured to execute a smoothing process based on the noise estimated by the noise estimation unit.

10. The image acquisition apparatus according to claim 8, wherein the noise reduction unit includes:

a noise estimation unit configured to estimate the noise of the image signal; and a smoothing unit configured to execute a smoothing process based on the noise estimated by the noise estimation unit, and wherein the noise estimation unit includes a noise correction unit configured to correct the noise based on the tone conversion coefficient set by the tone conversion unit.

11. The image acquisition apparatus according to claim 1, wherein the correction unit includes at least one of:

a sharpening unit configured to sharpen the image signal based on a resolution of the optical imaging system and the coordinate information recorded in the coordinate recording unit; and a WB adjustment unit configured to execute a white balance adjustment process based on the coordinate information recorded in the coordinate recording unit.

12. The image acquisition apparatus according to claim 1, further comprising a control unit configured to control focus of the optical imaging system based on the focal point detected by the focus detection unit.

13. A program recording device having recorded therein a program for causing a computer to execute functions comprising:

reading (i) an optical characteristic of a plurality of pupil-division lenses for pupil-dividing a light flux of object image light passed through an optical imaging system in an area on a surface of an image sensor that is configured to acquire an image of an object through the optical imaging system and to produce an image signal, (ii) image acquisition information of the optical imaging system, and (iii) the image signal obtained by an image acquisition operation of the image sensor; and correcting the image signal based on the optical characteristic of the plurality of pupil-division lenses corresponding to the area and a characteristic of the image sensor recorded in advance, according to coordinate information recorded in advance for specifying the area on the surface of the image sensor.

14. The program recording device according to claim 13, wherein the correcting the image signal includes correcting the image signal from the image sensor affected by the light flux passed through the plurality of pupil-division lenses, based on the coordinate information recorded in advance.

15. The program recording device according to claim 13, wherein the correcting the image signal includes correcting the image signal from the image sensor to focus only the light flux passed through the plurality of pupil-division lenses, based on the coordinate information recorded in advance.

16. The program recording device according to claim 13, wherein the correcting the image signal includes, based on the coordinate information recorded in advance, performing a correcting process differently between the area of the image sensor, in which only the light flux passed through the plurality of pupil-division lenses is focused and an area of the image sensor affected by a light flux other than the light flux passed through the plurality of pupil-division lenses.

17. The program recording device according to claim 13, wherein the coordinate information recorded in advance includes at least one of:

information on a coordinate in the area of the image sensor, in which only the light flux passed through the plurality of pupil-division lenses is focused;

information on a coordinate located outside of the area and not affected by the light flux passed through the plurality of pupil-division lenses; and information on a coordinate located on a boundary of the area and affected by the light flux passed through the plurality of pupil-division lenses.

18. The program recording device according to claim 13, wherein the correcting the image signal includes:

reducing noise of the image signal from the image sensor based on the coordinate information recorded in advance; and converting a tone of the image signal after reducing the noise, based on the coordinate information recorded in advance.

19. The program recording device according to claim 13, wherein the correcting the image signal includes:

converting a tone of the image signal from the image sensor based on the coordinate information recorded in advance; and reducing noise of the image signal after the converting the tone, based on the coordinate information recorded in advance.

20. The program recording device according to claim 19, wherein the converting the tone includes setting a tone conversion coefficient based on a brightness of the optical imaging system and the coordinate information recorded in advance and executing a tone conversion process based on the tone conversion coefficient.

21. The program recording device according to claim 19, wherein the reducing the noise includes:

estimating the noise of the image signal; and executing a smoothing process based on the estimated noise.

22. The program recording device according to claim 20, wherein the reducing the noise includes:
   estimating the noise of the image signal; and
   executing a smoothing process based on the estimated noise, and
   wherein the estimating the noise includes correcting the noise based on the tone conversion coefficient.

23. The program recording device according to claim 13, wherein the correcting the image signal includes at least one of:
   sharpening the image signal based on a resolution of the optical imaging system and the coordinate information recorded in advance; and
   executing a white balance adjustment process based on the coordinate information recorded in advance.

24. The program recording device according to claim 13, wherein the program causes the computer to execute further functions comprising:
   detecting a focal point based on a selected one of the image signal before the correcting and the image signal after the correcting; and
   controlling a focus of the optical imaging system based on the detected focal point.

* * * * *